United States Patent
Corazza et al.

(10) Patent No.: US 9,911,220 B2
(45) Date of Patent: Mar. 6, 2018

(54) AUTOMATICALLY DETERMINING CORRESPONDENCES BETWEEN THREE-DIMENSIONAL MODELS

(71) Applicant: Adobe Systems Incorporated, San Jose, CA (US)

(72) Inventors: Stefano Corazza, San Francisco, CA (US); Emiliano Gambaretto, San Francisco, CA (US); Charles Piña, San Francisco, CA (US); Daniel Babcock, San Jose, CA (US)

(73) Assignee: ADOBE SYSTES INCORPORATED, San Jose, CA (US)

( * ) Notice: Subject to any disclaimer, the term of this patent is extended or adjusted under 35 U.S.C. 154(b) by 0 days.

(21) Appl. No.: 14/811,259

(22) Filed: Jul. 28, 2015

(65) Prior Publication Data

US 2016/0027200 A1    Jan. 28, 2016

Related U.S. Application Data

(60) Provisional application No. 62/029,724, filed on Jul. 28, 2014.

(51) Int. Cl.
| | |
|---|---|
| *G06T 13/40* | (2011.01) |
| *G06T 15/20* | (2011.01) |
| *G06K 9/46* | (2006.01) |
| *G06K 9/52* | (2006.01) |
| *G06T 17/10* | (2006.01) |
| *G06K 9/62* | (2006.01) |
| *G06T 15/04* | (2011.01) |
| *G06K 9/00* | (2006.01) |

(52) U.S. Cl.
CPC ......... *G06T 13/40* (2013.01); *G06K 9/00362* (2013.01); *G06T 15/04* (2013.01)

(58) Field of Classification Search
CPC ......... G06T 17/20; G06T 19/00; G06T 17/00; G06T 17/10; G06T 17/005
See application file for complete search history.

(56) References Cited

U.S. PATENT DOCUMENTS

| | | | | |
|---|---|---|---|---|
| 2001/0002131 A1* | 5/2001 | DeRose | .................. | G06T 13/40 345/423 |
| 2001/0056308 A1* | 12/2001 | Petrov | .................... | G06T 17/20 700/98 |
| 2004/0218824 A1* | 11/2004 | Demaret | .................. | G06T 17/20 382/240 |
| 2008/0136814 A1* | 6/2008 | Chu | ........................ | G06T 13/40 345/419 |
| 2008/0170078 A1* | 7/2008 | Sullivan | .................. | G06T 17/20 345/473 |
| 2009/0195758 A1* | 8/2009 | Sobel | .................... | H04N 9/3185 353/69 |

(Continued)

*Primary Examiner* — Todd Buttram
(74) *Attorney, Agent, or Firm* — Keller Jolley Preece

(57) ABSTRACT

The present disclosure is directed to integrating external 3D models into a character creation system. In general, a character creation system imports an external 3D model by determining correspondence values for each vertex within the 3D model. Once imported, a user can customize the 3D character by adding texture to the character, adjusting character features, swapping out one or more character features, adding clothes and accessories to the character, automatically rigging the character, and/or animating the character.

20 Claims, 14 Drawing Sheets

(56) References Cited

U.S. PATENT DOCUMENTS

| | | | |
|---|---|---|---|
| 2011/0069866 A1* | 3/2011 | Kim | G06K 9/00369 382/103 |
| 2011/0246329 A1* | 10/2011 | Geisner | G06F 3/017 705/27.1 |
| 2011/0292034 A1* | 12/2011 | Corazza | G06T 17/20 345/419 |
| 2012/0176379 A1* | 7/2012 | Farrer | G06T 17/205 345/420 |
| 2013/0257857 A1* | 10/2013 | Kakizawa | G06F 3/04815 345/419 |
| 2013/0300736 A1* | 11/2013 | Schmidt | G06T 19/20 345/419 |
| 2015/0130788 A1* | 5/2015 | Bailiang | G06T 15/10 345/419 |
| 2015/0213646 A1* | 7/2015 | Ma | G06T 17/20 345/420 |
| 2015/0379769 A1* | 12/2015 | Luo | G06T 17/205 345/420 |

* cited by examiner

AUTOMATICALLY DETERMINING CORRESPONDENCES BETWEEN THREE-DIMENSIONAL MODELS

CROSS-REFERENCE TO RELATED APPLICATIONS

This application claims the benefit of and priority to U.S. Provisional Patent Application 62/029,724, filed Jul. 28, 2014. The entire contents of the foregoing patent application are hereby incorporated by reference.

BACKGROUND

1. Technical Field

One or more embodiments of the present disclosure relate generally to three-dimensional modeling. More specifically, one or more embodiments of the present disclosure relate to systems and methods for automatically determining correspondences between three-dimensional models.

2. Background and Relevant Art

The generation of three-dimensional (3D) content, and in particular 3D characters, is becoming increasingly popular. Animated 3D content, such as 3D characters, is typically included in animated movies, virtual storytelling, video games, industrial applications, simulations, teleconferencing, architecture, social interactions, and personal avatar creation. Despite these emerging uses, the creation and animation of 3D characters is still typically only performed by artists that have specialized training in 3D modeling and animation.

In many cases, a small group of artists, each having specialty training, is required to produce a fully functional 3D character. Specifically, generating a complete 3D character requires building a three-dimensional body frame, adding texture (e.g., skin, eyes, hair) to the character, rigging the character with bones and facial expressions, and adding custom animations to the character. As a result, creating a 3D character becomes a complicated process that typically requires a specially trained artist to complete each step.

One solution towards the creation of 3D characters is represented by character creation systems, also know as avatar systems. Conventional character creation systems allow a single user to create a 3D character. Despite their popularity, however, conventional character creation systems have typically failed to deliver a final result that is both visually compelling as well as unique. In other words, when creating a new 3D character using a conventional character creation system, a user often trades off between creating a 3D character that realistically moves and functions, but that looks like many of the other 3D characters, or creating a unique looking character that does not move correctly and appears to have broken animations.

Along similar lines, users often are unable to successfully import 3D characters, or information corresponding to the 3D character, into a conventional character creation system. For example, when a user creates an external 3D character outside of a character creation system and later imports the 3D character into the character creation system, the character creation system has difficulty integrating the 3D character into the character creation system. In particular, conventional character creation systems are not always able to import an external 3D character, and when a conventional character creation system does attempt to import an external 3D character, the conventional character creation system often imports the character improperly. At best, the conventional character creation system preserves the visual aspect of the 3D character at a high-level, but the character creation system is unable to integrate the character into the 3D character creation system in a manner that allows a user to customize and correctly animate the imported 3D character. Thus, if the user wants an operable 3D character within the character creation system, the user may need to redesign and create the 3D character from scratch within the character creation system, which is often impractical.

Accordingly, these and other problems exist with regard to generating and importing 3D characters in a character creation system.

BRIEF SUMMARY

Embodiments of the present disclosure provide benefits and/or solve one or more of the foregoing or other problems in the art with systems and methods for determining correspondence values between 3D models. In general, the systems and methods automatically determine correspondence values between 3D models or UV maps to allow a user to apply details from one 3D model or UV map to another 3D model or UV map. For example, once a correspondence is made between 3D models, the systems and methods can allow a user to customize one of the 3D models to include details of the other 3D model. In particular, the systems and methods can allow for, based on the determined correspondence, adding or enhancing the texture of the 3D model, adjusting 3D model features (e.g., geometry, blendshapes, and soft modifications), swapping out one or more features, adding clothes and accessories to the 3D model, automatically rigging the 3D model, and/or animating the 3D model.

Further, in some embodiments, the systems and methods may automatically perform one or more of the above functions. To illustrate, a user who creates a 3D model of a character using an external application, program, or service can import the external 3D model into a character creation system. Initially, when the external 3D model is imported, the systems and methods identify a 3D mesh, included with the 3D model, which is made up of vertices that form a polygon mesh structure of the 3D model. During the import process, the systems and methods may match vertices and/or polygons from the external 3D model to related vertices and/or related polygons in a predefined 3D template mesh having known attribute properties for each vertex.

In one or more embodiments, the systems and methods can match a correspondence value for a vertex of a first 3D model to one or more related vertices in a second 3D model. In this manner, the systems and methods can associate a vertex of the first 3D model with known values of the second 3D model. Upon determining the correspondence between the first and second 3D models, the systems and methods can allow for the application of the features of one of the 3D models (or related models) to the other 3D model.

In some example embodiments, the systems and methods can further generate and import a 3D model of an object. For example, a user may provide one or more two-dimensional ("2D") images of an object. The systems and methods may scan the image(s) and create a 3D model of the object by roughly connecting the object to a 3D template mesh. Based on the connection, the systems and methods can generate a 3D object mesh of the object based on the 3D template mesh. Once the 3D template mesh is transformed based on the object scans, the systems and methods can allow a user to customize the object, as described previously.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore considered to be limiting of its scope, the invention will be described and explained with additional specificity and detail through the use of the accompanying drawings in which.

DETAILED DESCRIPTION

Figure 1A:
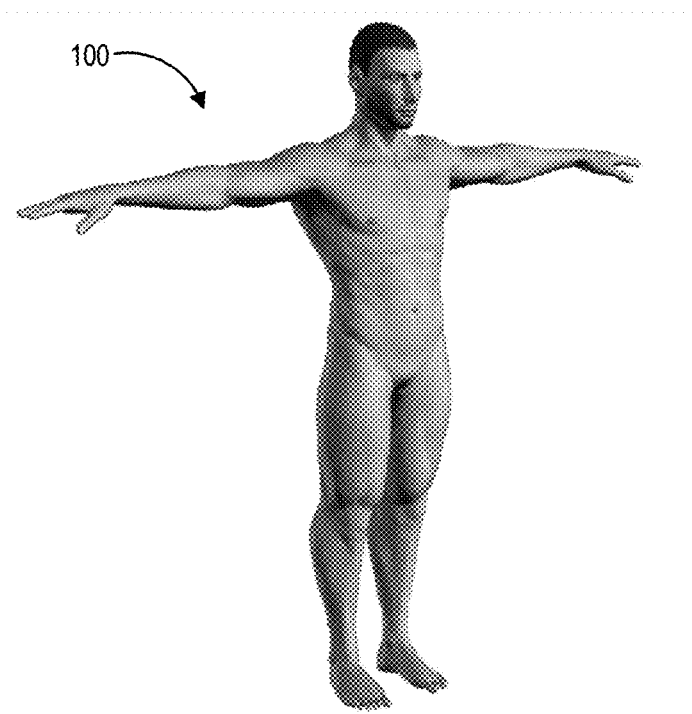
FIG. 1A illustrates an example external three-dimensional model in accordance with one or more embodiments described herein.

One or more embodiments of the present disclosure include a system that enables a user to automatically determine a correspondence between 3D models. The system can perform a correspondence between a first 3D model and a second 3D model that has known or different attributes and features. This can allow the system to apply the attributes or features of the second 3D model to the first 3D model.

In one or more embodiments, the system can comprise a character creation system. The character creation system can automatically match correspondence values between 3D models, such as an external 3D model and a 3D model template. This can allow the character creation system to add or enhance the texture of the 3D external model, adjust the external 3D model features (e.g., geometry, blendshapes, soft mods, and squishing), swap out one or more features, adding clothes and accessories to the external 3D model, automatically rig the external 3D model, and/or animate the external 3D model.

One will appreciate in light of the disclosure herein that a character creation system is one embodiment of a system that determines correspondences between 3D models. To aid in description of various aspects and embodiments of the present invention, the following figures and specification show/describe a character creation system that imports a 3D model of a character into the character creation system and determines correspondence values between the imported 3D model and a 3D template mesh or model. One will appreciate however, that the concepts and principles described herein can also apply to determining correspondence values between any 3D models and/or meshes. Further, while the character creation system is described in terms of a 3D model of a character, one will appreciate that the character creation system can determine correspondence values between any similar 3D objects (e.g., inanimate objects, non-humanoid characters). By determining correspondence values between similar 3D objects, the system can apply attributes and properties (e.g., colors and textures) from one model to the other model.

As mentioned, the character creation system can import an external 3D model of a character into the character creation system by calculating correspondence values between vertices and/optionally polygons in the external 3D model and related vertices and polygons identified in a predefined template mesh. By using the correspondence values, the character creation system can enable a user to customize the 3D model as well as use the external 3D model as if the model was created in the character creation system.

When determining correspondence values between 3D models, the character creation system can calculate correspondence values between vertices or polygons in one model (e.g., an external 3D model) and another model or mesh associated with the other model (e.g., the template mesh). For example, the character creation system can employ nearest neighbor calculations between a vertex of the 3D model and related vertices in the template mesh to determine a correspondence value. Alternatively, the character creation system can determine a correspondence value by projecting a vertex of the 3D model onto the closest polygon in the template mesh and performing barycenter calculation between the projected vertex of the 3D model and related polygon vertices in the template mesh. In some embodiments, the character creation system averages the values of related vertices or polygons in the template mesh to determine a correspondence value for a vertex or polygon in the 3D model. Additional methods and details regarding calculating correspondence values for an external 3D model are provided below.

Once a 3D model is imported into the character creation system, the character creation system can use the correspondence values to enable a user to modify the imported character, such as changing features of the character, modifying the texture of the character, adding clothing to the character, rigging the character with a bone structure, and animating the character. For instance, using the correspondence values, the character creation system can enable a user automatically to swap out body parts (e.g., add a different pair of legs), enlarge or reduce body part attributes (add muscle, lengthen or shorten arms, or shift the nose up or down), add or modify clothing and/or accessories, and animate the character using a number of prebuilt and/or customized animations. In this manner, the user can use a character created outside of the character creation system within the character creation system, including customizing the character using the character creation system.

In some example embodiments, the character creation system integrates a character into the character creation system by scanning one or more images of the character. For example, the character creation system may scan a digital photograph of a user's face. The character creation system may generate a mesh for the user's face by transforming a template mesh to match the scan of the user's face. The character creation system can the identify correspondence values from the template mesh. More specifically, in one or more embodiments, the character creation system deforms a predefined template mesh to match the scan of the user's face and/or body (e.g., with or without relying on further intermediate representations). Further, in some embodiments, the character creation system uses depth information, such as Red Green Blue (RGB) information or RGB with depth or distance ("RGB+D") information, in the image for fitting purposes. Using the correspondence values, as described above, the character creation system can create a 3D model of the scan of the user's face as well as allow the user to customize the 3D model (e.g., add a body and clothing, apply a different hair style, add animation).

The character creation system provides a number of benefits and advantages, as mentioned above. As one example, by using the correspondence values, the character creation system allows a user to correlate two 3D models together. As a more specific example, using the correspondence values allows the character creation system to import a uniquely created external character into the character creation system and customize the character as if the character was created in the character creation system. In particular, the character creation system allows a user to separate an imported 3D model in the originating body parts (e.g. head, arms, legs, and torso) to mix and match with other body parts, properly wrap the clothing and/or accessories items around the 3D model, apply pre-existing generic textures, generate a suitable skeleton, and compute optimal skinning weights for the 3D model's body, compute a set of customizations for the 3D model represented by blendshapes applied to the 3D model, and compute a set of blendshapes (including facial blendshapes in some embodiments) to use for animation.

As used herein, the term "three-dimensional model" (or "3D model") refers generally to a representation of an object (inanimate or living) in three-dimensional space. 3D models represent a 3D object using a collection of points in 3D space, connected by various geometric entities such as triangles, lines, curved surfaces, vertices, polygons, etc. This collection of points, in some cases, can form a three-dimensional mesh, defined below.

In some cases, a 3D model forms a three-dimensional character. As used herein, the term "three-dimensional character" (or "3D character") refers generally to a 3D model of a character. In one or more embodiments, a 3D character comprises a biped humanoid object. 3D characters can model fictional people (e.g., elves, ores, cartoon people, or zombies) or non-fictional people (e.g., soldiers, doctors, famous people, users themselves). In some cases, however, a 3D character can comprise a non-humanoid object, such as an animal, fictitious creature or 3D emoji. Also, because a 3D model may form a 3D character, in some cases, the terms may be used interchangeably.

As used herein, the term "three-dimensional mesh" (or "3D mesh") generally refers to a set of polygons defining the surface of a three-dimensional object or character. Similarly, the term "two-dimensional mesh" (or "2D mesh") generally refers to 2D representation of a set of polygons defining the surface of an object or character. In some cases, the 2D mesh may correspond to a UV mesh within a UV map, defined below. Further, when the UV mesh only forms a portion of an object or character, the UV mesh may be called a shell, particularly in 2D or UV space. For example, a shell for the head, torso, arms, and legs can form a UV mesh of a body for a character. Likewise, separate 3D parts (e.g., body part) of the 3D mesh may be called a portion (e.g., an arm portion, torso portion or leg portion).

Vertices connected together generally form polygons in a 3D mesh or 2D mesh. The character creation system can associate various types of information and values with each vertex and/or polygon in a 3D mesh or 2D mesh. For example, the character creation system may create an index that identifies corresponding information and values for each vertex and/or polygon on a three-dimensional template mesh (or simply "template mesh"). For instance, each vertex and/or polygon on the template mesh can include the body part or portion (e.g., head, face, hair, arms, torso, or legs) to which the vertex and/or polygon belongs, the skin or texture value associated with the vertex and/or polygon, how the vertex and/or polygon moves (e.g., morphs targets) in connection with adjacent vertices/polygons when the character is animated, and/or various weighting applied to the vertex and/or polygon.

The term "map," as used herein refers to a 2D image that shows the surface of a 3D model. Most 3D models can be converted into one or more maps. The process of UV mapping includes making a 2D image representation of a 3D model's surface by converting the 3D model for a model into a two-dimensional image. To illustrate, UV mapping may include unwrapping a 3D model by virtually adding seams to the 3D model and disconnecting the 3D model at the seams until the 3D model lays flat on a 2D image. Examples of maps include, but are not limited to, a mesh map, a color map, a texture map, a normal map, an ambient occlusion map, a detail map, a diffuse map, a specular map, and a detail overlay map.

The term, "correspondence value," as used herein refers to a value that associates a vertex in an external 3D model with related vertices on a 3D mesh having known values, such as vertices on a 3D template mesh. In other words, when an external 3D model has a 3D mesh that does not have a one-to-one correspondence with the template mesh, the character creation system may not be able to directly map known values from vertices of the template mesh, which have known values, to a vertex on the 3D model, which has a unknown value. Rather, the character creation system determines a correspondence value for each vertex of the external 3D model based on related vertices of the template mesh. In this manner, the character creation system can interpolate or infer a corresponding value for each vertex of the external 3D model, particularly those without a one-to-one correspondence. Additional detail regarding correspondence values is provided below.

As used herein, the term "vertex" (plural "vertices") generally refers to a data structure that describes certain attributes, like the position of a point in 2D or 3D space. Because vertices can, in some cases, make up a polygon, references to a vertex or vertices can as refer to a polygon that corresponds to the vertex or vertices. As used herein, the term "related vertices" (or "related polygon") generally refers to one or more vertices (or polygon) on the template mesh that correspond to a particular vertex (or polygon) of the external 3D model. In general, the vertex (or polygon) of the external 3D model relates to vertices (or polygon) on the template mesh that share the same location relative to their corresponding mesh structures (e.g., project or land in the same location relative to their mesh structures). For example, a vertex (or polygon) located on the large left toe of the external 3D model refers to a group of vertices (or polygons) on the larger left toe of the template model.

As used herein, the term "skeleton" generally refers to a set of connected bones that are bonded to a 3D mesh to provide motion to the 3D model when the 3D model is animated. Further, the term "skinning weights" generally refers to a set of weights defining the relations between the motion of a three-dimensional mesh and the underlying skeleton bones. The process of adding a skeleton to a 3D model is called rigging. The term "rigging," as used herein generally refers to creating a suitable skeleton for a 3D model and binding it to the 3D mesh of 3D model through a proper set of skinning weights. The term "blendshape rigging" used herein generally refers to the process of creating a suitable set of blendshapes (or morph targets) for the character mesh to be deformed accordingly. The term "animation," as used herein, refers generally to the motion applied to the skeleton or the blendshapes, which drive the 3D mesh deformation, or the movements of polygons within a 3D mesh in response to movement by the 3D model.

FIG. 1A illustrates an example of an external three-dimensional model 100. As shown, the external 3D model 100 is a biped humanoid model of a male character in a "T" pose. The external 3D model 100 does not include clothing or accessories, however, as mentioned above, a user can separately import clothing and accessories for the external 3D model 100. While FIG. 1A illustrates a character, one will appreciate that the following description can correspond to other types of 3D models, including non-humanoid objects.

The external 3D model 100 is created outside of the character creation system. For example, a user may create the external 3D model 100 using a third-party 3D character modeling application. In another example, the user may otherwise obtain the external 3D model 100, such as by downloading the external 3D model 100 from the Internet or a third-party character database. In another example, a 3D model can be derived from a 3D scan of a person, as described below. Because the external 3D model 100 was not created in the character creation system, the character creation system may first import and integrate the external 3D model 100 into the character creation system to allow the user to customize, rig, or animate the external 3D model 100 within the character creation system.

As mentioned above, when a user provides the external 3D model 100 to the character creation system as part of the importing process, the character creation system may identify a 3D character mesh of the external 3D model 100. For example, the 3D character mesh may be included within the same file or package as the external 3D model 100. Alternatively, the 3D character mesh may be located in a separate file or package that is associated with the external 3D model 100.

Figure 1B:
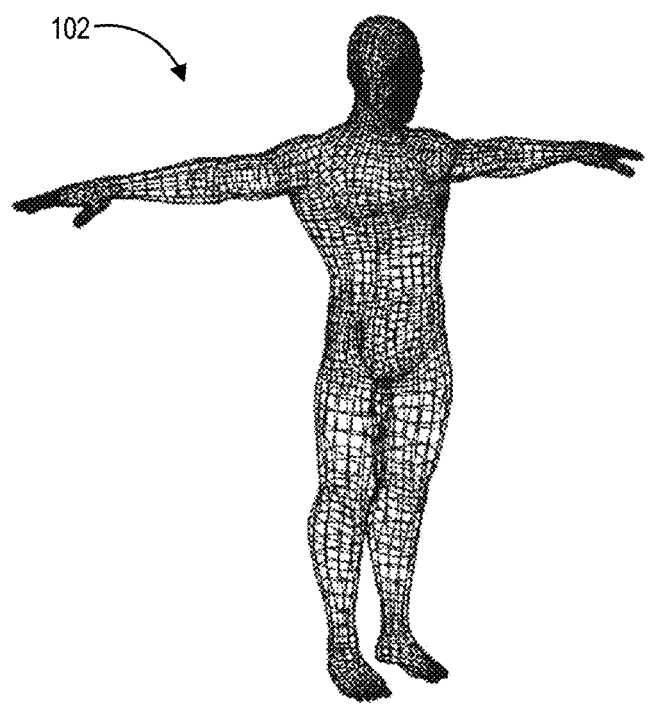
FIG. 1B illustrates an example three-dimensional mesh of the external three-dimensional model of FIG. 1A in accordance with one or more embodiments described herein.

To illustrate, FIG. 1B shows an example three-dimensional mesh 102 (or "3D character mesh 102") of the external three-dimensional model 100 of FIG. 1A. As mentioned above, the 3D character mesh 102 may form the underlying structure of the external 3D model 100. In other words, the 3D character mesh 102 becomes visible upon removing the texture (e.g., skin) from the external 3D model 100.

As shown in FIG. 1B, the 3D character mesh 102 is made up of polygons. Vertices form the polygons in the 3D character mesh 102. For example, three vertices may connect together to form a triangular polygon. In another example, four or more vertices may form a rectangular polygon. Depending on the resolution of the 3D character mesh 102, the number of polygons may range from thousands to millions. In one or more embodiments, however, a lower number of polygons are preferred when importing an external 3D model 100 into the character creation system. Further, some areas of the 3D character mesh 102 may include a higher density of vertices and polygons, which corresponds to a higher level of detail. For instance, the face area includes a higher density of polygons than the torso area because users generally focus on a character's face, particularly when the face moves with animation.

Figure 2:
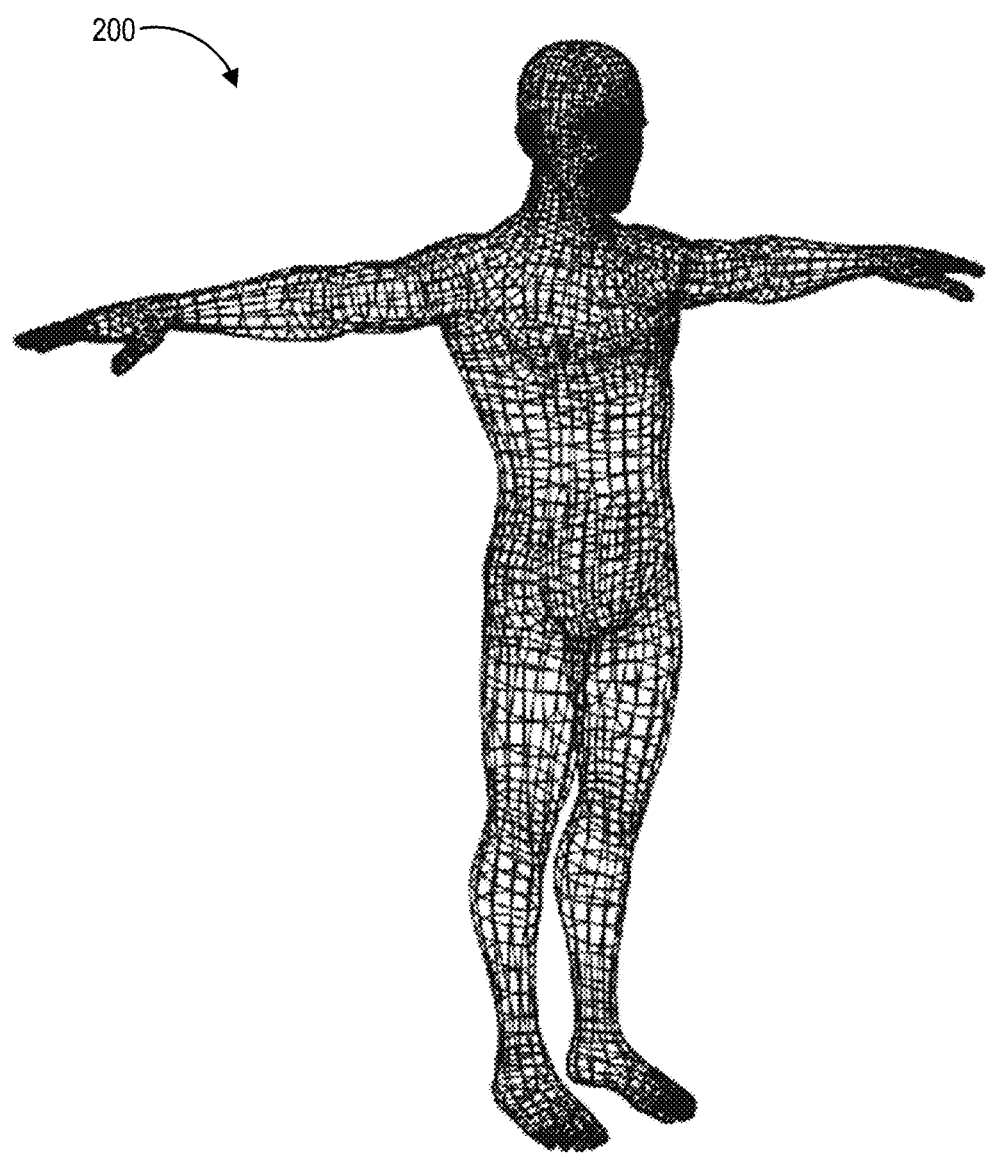
FIG. 2 illustrates an example three-dimensional template mesh in accordance with one or more embodiments described herein.

FIG. 2 illustrates an example three-dimensional template mesh 200. Similar to the 3D character mesh 102, the 3D template mesh 200 is made up of vertices and polygons. Unlike the 3D character mesh 102, however, the vertices and polygons of the 3D template mesh 200 have known attribute values within the character creation system. The 3D template mesh 200 can represent the archetype of the characters created within the character creation system.

More specifically, when the character creation system creates the 3D template mesh 200, the character creation system can associate each vertex and/or polygon in the 3D template mesh 200 with a value or property for one or more character attributes. For example, the character creation system can indicate polygon #180 belongs to the arm portion or to the torso portion. As another example, the character creation system can associate polygon #180 with a specific value corresponding to one or more maps, such as a texture map, detail overlay, normal map, ambient occlusion map, or a color map.

In addition, the character creation system can assign a weight to the vertex and/or polygon, such as a skinning weight. Further, the character creation system can assign a blendshape value to a vertex and/or polygon on the 3D template mesh 200 (e.g., to blend together two different values meeting at a seam). Thus, the character creation system associates each vertex and/or polygon in the 3D template mesh 200 with an index value that indicates how the vertex and/or polygon corresponds to various maps and what properties the vertex and/or polygon exhibits.

By leveraging the values assigned to each vertex and/or polygon on the 3D template mesh 200, the character creation system can lookup information corresponding to each value and properly display the character. Continuing the example from above, the character creation system can lookup polygon #180 in a lookup table and identify corresponding values that are associated with polygon #180. Further, the character creation system can update the value for a vertex and/or polygon when character attributes associated with the vertex and/or polygon change due to user customization (e.g., adding/modifying the skin properties, adding clothing and accessories, or swapping body parts) rigging the character with a bone structure, and/or animation. In this manner, the character creation system can maintain an up-to-date lookup database for each vertex and/or polygon in the 3D template mesh.

In one or more embodiments, the character creation system can include different template meshes that a user can select from. For example, the character creation system can maintain a high-resolution template mesh, a medium-resolution template mesh, and a low-resolution template mesh. The various resolutions of template meshes can allow a user to modify the resolution of a 3D model being integrated into the character creation system. For instance, if the external 3D model is a high resolution model, but the user desires a lower resolution model for use in the character creation system, the user can select the lower-resolution template mesh. In this case, the character creation system can map the higher resolution 3D model to the lower-resolution template mesh using the correspondence process described herein. Alternatively, the character creation system can map a lower resolution 3D model to a higher-resolution template mesh using the correspondence process described herein.

Figure 3:
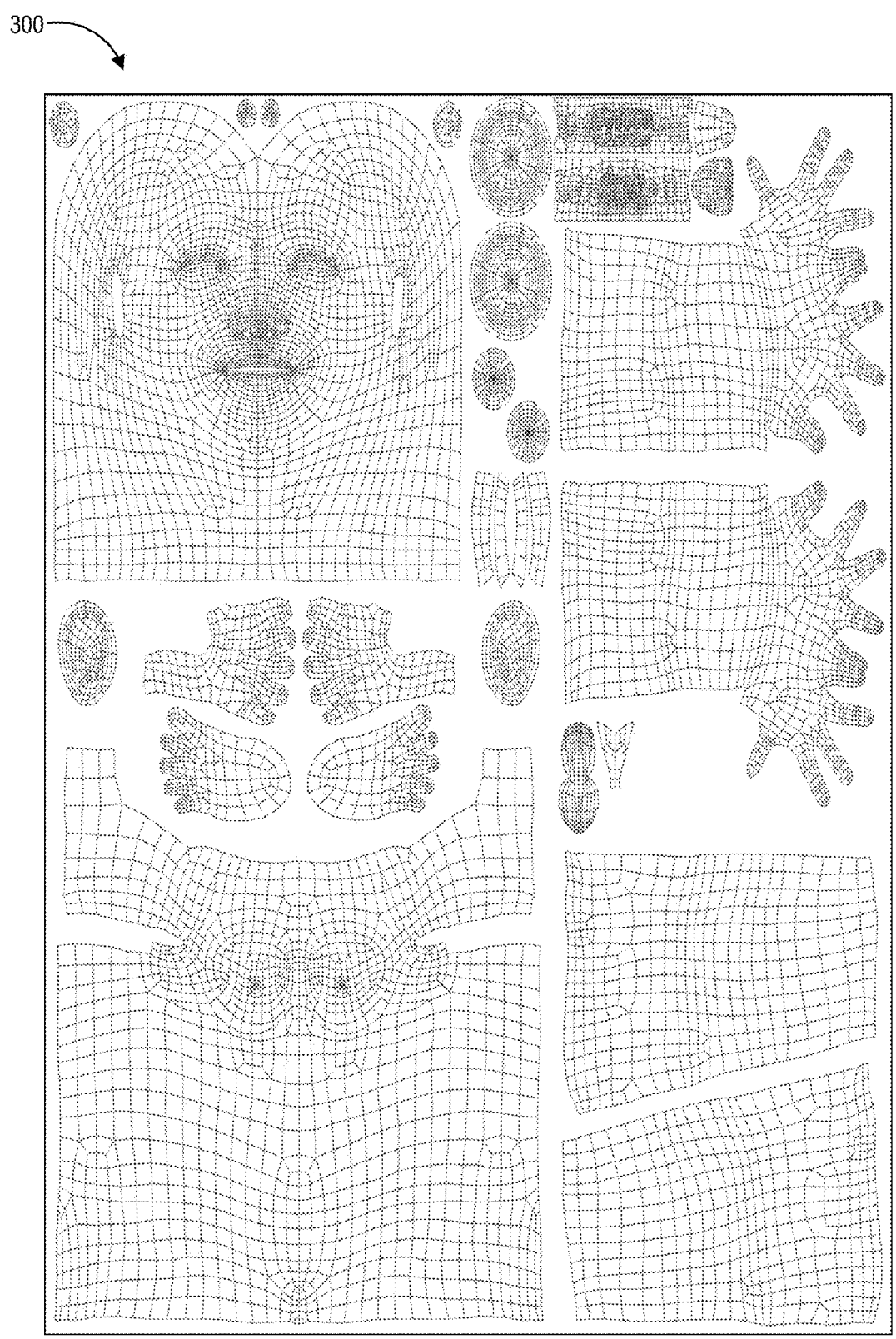
FIG. 3 illustrates an example UV mapping of the three-dimensional template mesh of FIG. 2 in accordance with one or more embodiments described herein.

As mentioned above, the character creation system can create a 2D mesh map from a 3D mesh. For example, the character creation system may create a UV mesh map from the 3D template mesh 200. To illustrate, FIG. 3 shows an example UV map 300 of the 3D template mesh 200 of FIG. 2. The UV map 300 can comprise an unwrapping of the 3D template mesh 200. In particular, the 3D template mesh 200 can be cut along "seams" to transition the 3D template mesh 200 to a 2D state or UV map. The UV map 300 may include the same vertices and polygons as the 3D template mesh 200 (e.g., face, eyes, teeth, mouth, hands, feet, torso, arms, and legs). Accordingly, each vertex in the UV map 300 may also be associated with index values that correspond to character attributes.

In some example embodiments, the UV map 300 directly maps to other maps created by the character creation system for a character created within the character creation system. For example, the character creation system may create a normal map, an ambient occlusion map, and a detail overlay map that aligns with the UV map 300. In this manner, the character creation system can create a number of 2D maps that each represents various 3D attributes of the character.

Using the 3D template mesh 200 and/or the UV map 300, the character creation system can integrate the external 3D character model 100 into the character creation system. Specifically, the character creation system can determine a correspondence value for each vertex in the 3D character mesh 102 based on related vertices of the 3D template mesh 200 and/or the UV map 300. Once correspondence values are determined for each vertex in the 3D character mesh 102, the character creation system can properly integrate the external 3D model, as well as enable user customization, rigging the character with a bone structure, and animation of the 3D character model 100 within the character creation system.

More specifically, the correspondence process can allow the character creation system to separate the external 3D model 100 into originating body parts (e.g., head, arms, legs, torso) for mix and matching with other body parts. The correspondence process can allow the character creation system to properly wrap clothing/accessories about/to the external 3D model 100 and/or apply pre-existing textures to the external 3D model 100. Additionally, the correspondence process can allow the character creation system to generate a suitable skeleton and compute optimal skinning weights for the body of the external 3D model 100. The correspondence process can allow the character creation system to compute a set of customizations for the external 3D model 100. These customizations can be represented as blendshapes applied to the external 3D model 100. Furthermore, the correspondence process can allow the character creation system to compute a set of blendshapes for use in animation.

As mentioned above, the character creation system determines a correspondence value for a vertex (or polygon) of the 3D character mesh 102 based on related vertices (or related polygon) of the 3D template mesh 200 and/or the UV map 300. Before determining a correspondence value for a vertex of the 3D character mesh 102, the character creation system can identify which vertices in the 3D template mesh 200 and/or the UV map 300 potentially relate to the 3D character mesh vertex.

In particular, in one or more embodiments, the external 3D character model 100 uses the same or similar UV mapping as the UV map 300 associated with the 3D template mesh 200. In other words the seams used to transition the 3D template mesh 200 to the UV map 300 can be applied in the same or similar positions to create a UV map for the external 3D character model 100. The external 3D character model 100 can then use the similar UV mapping between the external 3D character model 100 and the 3D template mesh 200 to determine the correspondences between the vertices of the external 3D character model 100 and the 3D template mesh 200. The character creation system can use the UV mapping as a look-up table to identify the different body parts, attributes, and coordinates on the 3D mesh of the character.

As described above, for each vertex of the 3D character mesh 100, the character creation system can identify related vertices on the 3D template mesh 200. Further, by fitting the 3D template mesh 200 to the 3D character mesh 100, the character creation system can select related vertices that better correspond to a vertex of the 3D character mesh 102. In other words, when the 3D template mesh 200 matches the 3D character mesh 102, a vertex from the 3D character mesh 102 is more likely to land next to corresponding vertices on the 3D template mesh 200.

When corresponding the 3D template mesh 200 with the 3D character mesh 102, a vertex from the 3D character mesh 102 may land within a polygon of the 3D template mesh 200. As such, the character creation system may select each of the vertices of the polygon as the related vertices for the vertex. Using the related vertices, the character creation system can determine a correspondence value for the vertex, as described below. Alternatively, rather than selecting vertices belonging to the same polygon, the character creation system may select the three or more closest vertices in the 3D template mesh 200 as the related vertices for the 3D character mesh vertex. As another alternative, the character creation system can select all vertices in the 3D template mesh 200 within a threshold distance of the 3D character mesh vertex as related vertices. In some cases, the threshold distance can be large, or even infinite.

In one or more alternative embodiments, the character creation system selects related vertices and/or polygon for a 3D character mesh vertex by comparing a mapping of the 3D character mesh 102 to the UV map 300. In other words, the character creation system maps the 3D character mesh 102, as described above, to create a 2D character map. The character creation system then overlays or projects the character map on the UV map 300 to identify related vertices and/or polygon for each vertex and/or polygon on the character map. In some example embodiments, the character creation system selects related vertices and/or polygon of the UV map that have UV coordinate close to the coordinates of the 3D character mesh vertex and/or polygon. Further, when the 3D template mesh 200 is modified to better fit the 3D character mesh, as described above, the character creation system can create a modified UV map that better fits the character map before identifying related vertices and/or polygon. In other words, the character creation system can generate an updated UV map based on the updated 3D template mesh.

Once the character creation system identifies related vertices and/or a related polygon from the 3D template mesh 200 for a 3D character mesh vertex and/or polygon, the character creation system can calculate a correspondence value for the 3D character mesh vertex and/or polygon based on the related vertices and/or polygon. The character creation system can use one or more calculations to determine a correspondence value for a 3D character mesh vertex and/or polygon. In general, the character creation system interpolates a correspondence value for a 3D character mesh vertex and/or polygon using the relative vertices (or polygon) identified for the 3D character mesh vertex and/or polygon.

To illustrate, in one or more embodiments, the character creation system uses a nearest neighbor algorithm to determine a correspondence value for a 3D character mesh vertex. Under the nearest neighbor algorithm, the character creation system selects the value of the nearest vertex to the 3D character mesh vertex and ignores the values of neighboring vertices included as part of the related vertices. As such, the correspondence value of the 3D character mesh vertex matches the nearest neighbor vertex of the related vertices.

In some embodiments, the character creation system determines the correspondence value for a 3D character mesh vertex by projecting the 3D mesh vertex onto the template surface (e.g., the closest polygon) and/or performing a barycenter calculation using the related vertices. A barycenter calculation interpolates the center of mass between the related vertices to arrive at the correspondence value for the 3D character mesh vertex. Thus, when using barycenter calculations, the correspondence value for a 3D character mesh vertex does not match any vertex of the related vertices, but rather is a value generated based on the position and location of each of the related vertices for a 3D character mesh vertex.

Similarly, in alternative embodiments, the character creation system determines the correspondence value for a 3D character mesh vertex by averaging the values of the related vertices. In some example embodiments, the character creation system determines the correspondence value for a 3D character mesh vertex by weighting the value each vertex in the related vertices based on the relative distance between the vertex and the 3D character mesh vertex. In other embodiments, when a 3D character mesh vertex lands within a polygon on the 3D template mesh 200, the character creation system uses the center value of the polygon as the correspondence value for the 3D character mesh vertex.

Once the character creation system calculates a correspondence value for a 3D character mesh vertex, the character creation system can associate the correspondence value with the 3D character mesh vertex. In this manner, the character creation system can use the correspondence value for a 3D character mesh vertex to lookup the properties of each character attribute. Further, upon determining the correspondence values for each vertex of the 3D character mesh 102, the character creation system can identify the properties of each character attribute for the entire 3D character mesh 102. Identifying the character attribute properties for each vertex in the 3D character mesh 102 allows the character creation system to fully import and integrate the 3D character mesh 102 and external 3D model 100 into the character creation system.

Referring specifically to the character creation system determining correspondence values using the UV map 300, in one or more embodiments, the external 3D character model 100 uses a different UV mapping than the UV map 300 associated with the 3D template mesh 200. For example, the character creation system uses computer vision and image processing methods to automatically align the UV mapping of the external 3D character model 100 to the UV map 300 associated with the 3D template mesh 200. In a similar manner as described above with respect to the external 3D character model 100, the character creation system can use the aligned maps to identify the same or similar vertices and/or polygon, which allows the character creation system to determine correspondence values.

Further, when using the UV map 300 to determine correspondence values, in some instances, a vertex and/or polygon from the character map projects outside of the UV map 300. In these instances, the character creation system may select the closest one or more vertices and/or polygons of the UV map 300 as related vertices or polygons. For example, the character creation system may first identify which shell or portion on the UV map 300 is closest or best corresponds to the character map vertex and/or polygon. In this manner, the character creation system may prevent the character map mesh vertex and/or polygon from being associated with the wrong shell (e.g., prevent a character map vertex and/or polygon on the shoulder from being associated with vertices and/or a polygon from the neck or torso of the UV map 300). In some cases, the character creation system may use machine learning to identify the feature, body part, portion, or shell to which the UV character map vertex and/or polygon corresponds on the UV character mesh 102 and identify the corresponding shell on the UV map 300.

Once the character creation system identifies the appropriate shell from the UV map 300, the character creation system can further identify the closest polygon to which the 3D character mesh vertex or polygon corresponds. The character creation system can select the related vertices or polygon from the closest identified polygon and extrapolates a correspondence value from the identified vertices or polygon. In some example embodiments, while the character creation system select the vertices of the closest polygon as the related vertices, the character creation system gives additional weight to the edge vertex in the UV map 300 closest to the character map vertex when determining a correspondence value for the character map, as described below.

The foregoing description describes determining correspondence between two 3D models using UV maps, or in other words within the UV space. Alternatively, one or more embodiments involve determining correspondence between two 3D models in the 3D space. For example, to determine related vertices/polygons, in one or more embodiments, the character creation system superimposes the 3-D template mesh over the 3-D character mesh. Upon superimposing the 3-D template mesh over the 3-D character mesh, the character creation system can select related vertices/polygons for a vertex/polygon on the 3-D character mesh.

Because the 3-D template mesh is a template, the 3-D mesh may not fit the template. As such, in some example embodiments, the 3-D template mesh can be modified to better fit the 3-D character mesh. The character creation system can automatically fit the 3-D template mesh to the 3-D character mesh. For example, the character creation system can identify features of the 3-D character mesh and match the feature to the 3-D template mesh. For instance, the character creation system can identify fingers on the 3-D character mesh and match them to the fingers on the 3-D template mesh. Similarly, the character creation system can match the top of the head, the bottom of the feet, arms and legs, etc., from the 3-D character mesh to the 3-D template mesh. In some example embodiments, the character creation system uses machine learning to identify features of the 3-D character mesh and automatically match the identified features to the 3-D template mesh.

As described above, for the vertices/polygons of the 3-D character mesh, the character creation system can identify related vertices on the 3-D template mesh. Further, by fitting the 3-D template mesh to the 3-D character mesh, the character creation system can select related vertices that correspond to a vertex of the 3-D character mesh. In other words, when the 3-D template mesh fits the 3-D character mesh, vertices/polygons from the 3-D character mesh are more likely to land next to corresponding vertices/polygons on the 3-D template mesh.

Figure 4:
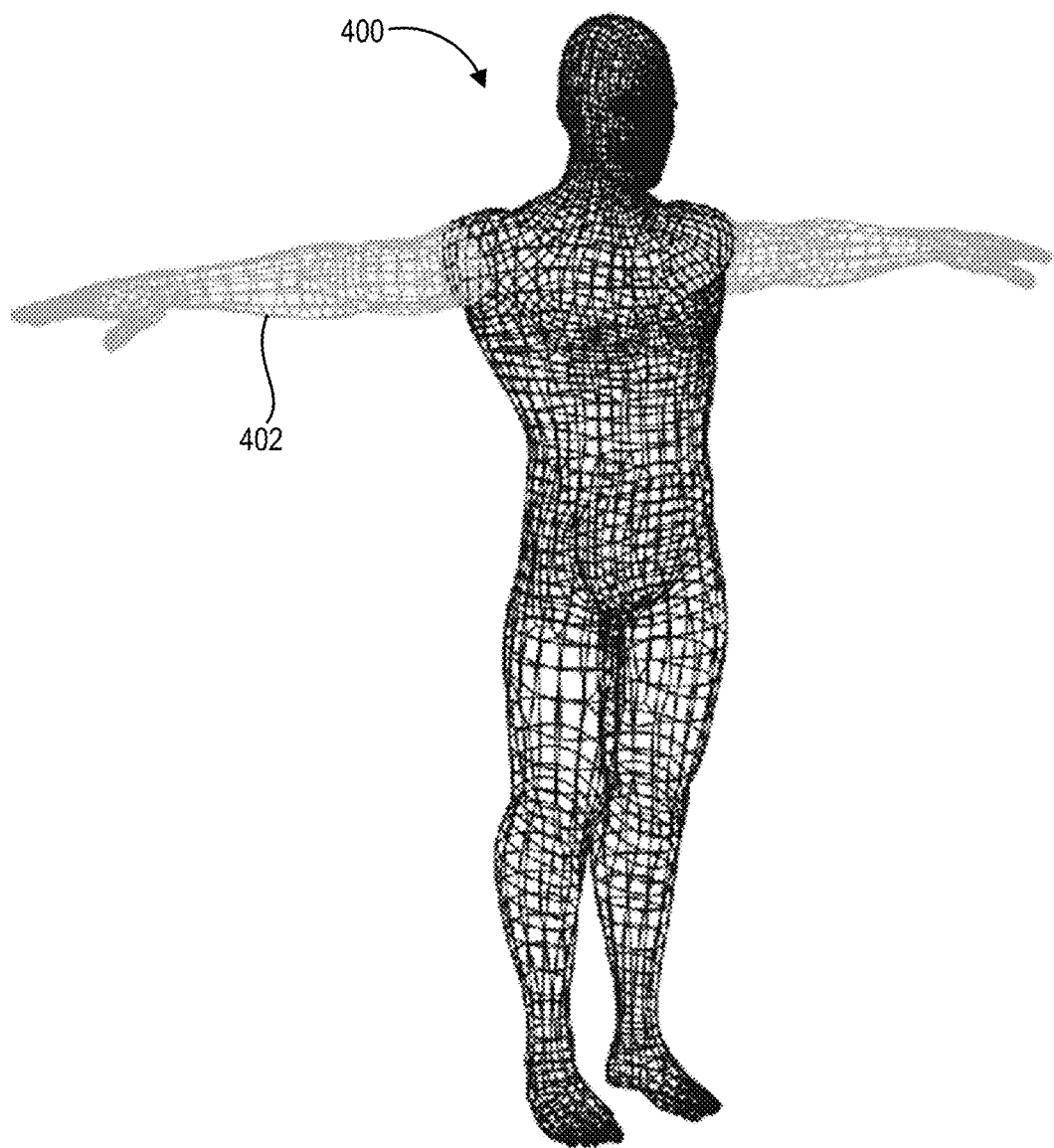
FIG. 4 illustrates an example of the three-dimensional mesh of the external three-dimensional model of FIG. 1A with select portions of the three-dimensional mesh selected in accordance with one or more embodiments described herein.

To illustrate, FIG. 4 shows a fully integrated 3D character mesh 400 of the external 3D model 100. Further, FIG. 4 illustrates that the arm portion 402 is selected. The character creation system can allow a user is able to select the arm portion because each vertex in the integrated 3D character mesh 400 is associated with a portion. Thus, when a user selects a vertex, the character creation system identifies that the selected vertex is part of the arm portion 402 of the integrated 3D character mesh 400. Further, the character creation system identifies and selects each other vertex that belongs to the arm portion 402. If the user selects a vertex that is associated with another part of the integrated 3D character mesh 400 (e.g., a vertex in the torso), the character creation system can select each vertex that also belongs to the torso portion.

Figure 5:
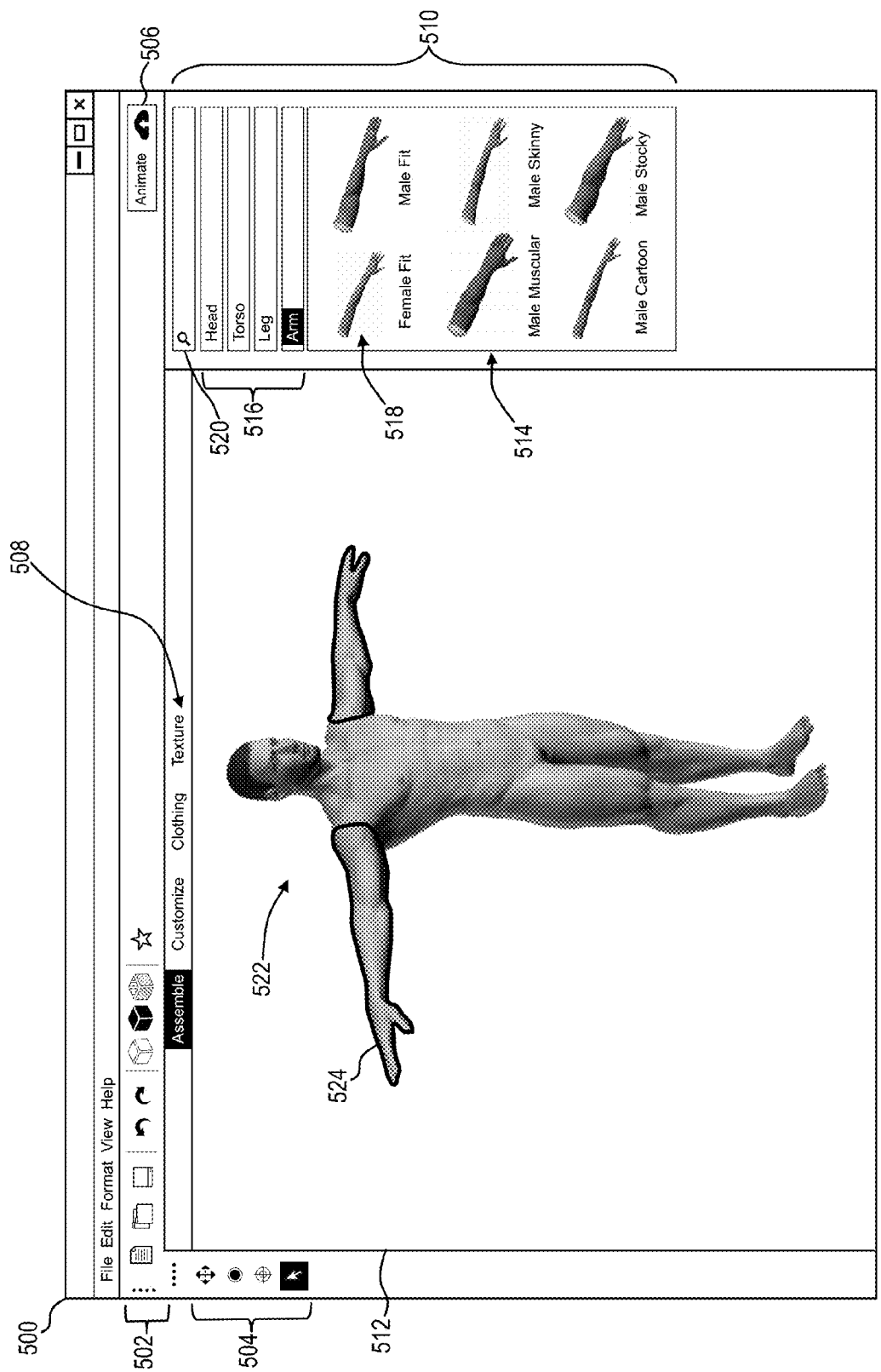
FIG. 5 illustrates an example graphical user interface of the character creation system in accordance with one or more embodiments described herein.

While FIG. 4 illustrates an integrated 3D character mesh 400, the character creation system can also generate a fully integrated 3D model 522 of the character (shown in FIG. 5). In other words, through adding the skin to the integrated 3D character mesh 400, the character creation system can transform the external 3D model 100 into an integrated 3D model 522 of the character. Further, because the integrated 3D model 522 is built upon the integrated 3D character mesh 400, the character creation system can customize the integrated 3D model 522, as described below with respect to FIG. 5.

FIG. 5 illustrates an example graphical user interface 500 (or "GUI 500") of the character creation system. The one or more server(s) 1010 and/or the client device 1040 described with respect to FIG. 1, can display the GUI 500. For example, the GUI 500 may be part of a character creation application loaded on a client device.

As shown, the GUI 500 includes a menu toolbar 502, a selection toolbar 504, an animate option 506, a creation toolbar 508, a creation panel 510, and a character area 512. The menu toolbar 502 can include options such as creating a new character, opening an existing character, saving the current character, undoing, and redoing. The menu toolbar 502 can also include viewing options, such as the option to view the character as a model (e.g., with skin and clothes (if available)), as a mesh frame, or as a mesh frame over the model. Further, the toolbar menu 502 can include a favorites option to save the character as a default character within the character creation system.

The selection toolbar 504 may include options to pan and zoom, rotate and zoom, center, and select items in the character area 514 (e.g., select parts of the character) as well as select and customize adjustable parts. The animate option 506 may prepare the character to be animated, as described below. The creation toolbar 508 may include options to assemble a character, customize a character, add clothing to the character, and add/modify the texture of the character. Depending on which option a user selects, the creation panel 510 may display different options that correspond to the selected option within the creation toolbar 508. For instance, as shown, the creation panel 510 displays the options to select body parts from various body regions 516, or search for body parts 518 using a search field 520. In particular, FIG. 5 shows a user selecting the arms body region within the creation panel 510, upon which, the GUI 500 provides a number of different arm choices 518 to the user.

The creation panel can also display options for a user to customize individual features of the character in the character area 512, such as lengthening or shortening, enlarging or decreasing the size, changing the shape, and/or changing the location/position of body parts. The creation panel can also display various clothing and accessory options to add to the character in the character area 512 (described below with respect to FIGS. 6A-6B) as well as editing the texture (e.g., color, shape, and pattern) of the character's skin, clothing, and/or accessories.

The character area 512 generally displays the fully imported character that a user is creating and/or modifying. Specifically, as shown in FIG. 5, the character area 512 displays the integrated 3D model 522. In some example embodiments, and as shown in the character area 512, the character creation system dynamically applies texture (e.g., skin) to the character (e.g., the character creation system automatically added skin to the integrated 3D character mesh 400 before showing the character in the character area 512).

In addition, because the external 3D character has been imported and integrated into the character creation system, a user can use the character creation system to edit the character as if the character was created within the character creation system. To illustrate, a user selects the arms 524 (e.g., arm portion 402 covered with skin) of the integrated 3D model 522. Upon selecting the arms 524, the user can modify the form and shape of the arms. For example, the use can lengthen or shorten the arms, add muscle to the biceps or triceps, and/or move the arms higher or lower on the shoulders. Further, the user can switch out the arms with other arms choices 518 shown in the creation panel 510. For instance, the user can swap out the arms of the integrated 3D model 522 with "male skinny" arms or even "female fit" arms. Accordingly, through fully integrating the external character in to the character creation system, the character creation system can easily modify each aspect of the character as if the character was originally created within the character creation system.

Further, the user can clothe and accessorize the character. For example, upon selecting the clothing option in the creation toolbar 508, the character creation system can provide the user with a number of clothing options to add to the integrated 3D model 522. In other words, even though the character was created in another system, upon fully importing the character, the character creation system can enable a user to clothe and accessorize the character using clothing belonging to the character creation system. Alternatively, the character creation system can import clothes and accessories along with the external character and add the imported clothes and accessories to the integrated 3D model 522.

Figure 6A:
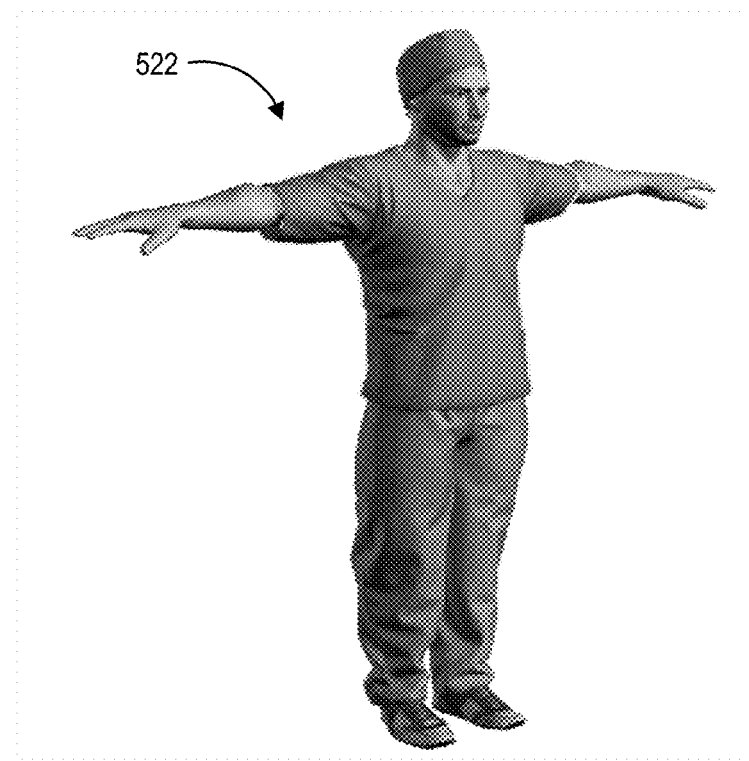
FIGS. 6A-6B illustrate examples of customizations the external three-dimensional model of FIG. 1A made using the character creation system in accordance with one or more embodiments described herein.
Figure 6B:
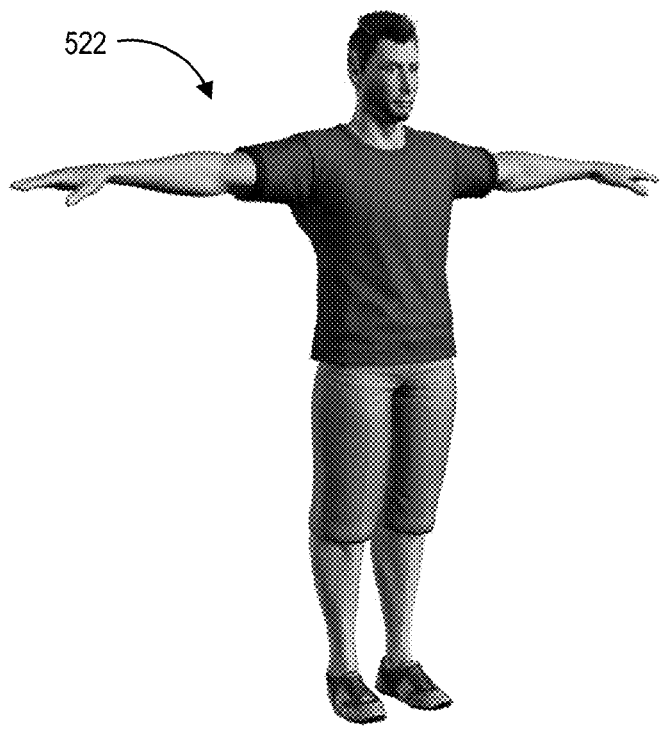

To illustrate, FIGS. 6A-6B illustrate examples of customizing the 3D character. For example, in FIG. 6A, a user may select scrubs, a surgeon's cap, and tennis shoes to add to the 3D character 522. In FIG. 6B, the user may replace the scrubs on the 3D character 522 with a tee shirt and khaki shorts. In addition, the user may replace the surgeon's cap with hair. As such, because the 3D character is integrated into the character creation system, the user can mix and match which clothes and accessories (including hair, facial hair, eye glasses, ear rings, etc.) are added to the character. Further, regardless of which clothes and accessories the user selects, the character creation system can use the correspondence values of the 3D character to ensure that the clothes and accessories properly deform (e.g., fit) and conform to the morphology of the 3D character. The character creation system can use mean value coordinates to drive the deformation of clothing and accessories to conform to the morphology of the 3D model. The mean value based deformation can be driven by the character template mesh.

In addition, upon fully importing the integrated 3D model 522, the character creation system can rig the character with a bone structure and animate the integrated 3D model 522. In particular, using the correspondence value of each vertex in the integrated 3D model 522, the character creation system can apply the proper rigging structure and blendshapes to each vertex. For example, the character creation system can identify which vertices in the integrated 3D model 522 form the knees and rig those vertices to bend accordingly. Further, once the integrated 3D model 522 is rigged, the character creation system can enable a user to add animation to the integrated 3D model 522, such as preconfigured animation moves. In some embodiments, the character creation system uses machine learning algorithms to compute the body and/or face rigs from the correspondence values using a training set. In one or more embodiments, machine learning processes and/or training sets can allow the character creation system to refine linear or non-linear relations between the original information and the final result.

In addition to the foregoing, the character creation system can apply textures to the character mesh by maintaining the UV layout using the correspondence values. In particular, the character creation system can composite disparate textures together by sampling the texture for the corresponding part, and blending the areas where UV seams are known.

Furthermore, the character creation system can apply bone rigging by fitting a 3D skeleton to the 3D model by leveraging the correspondence and a reference skeleton fitted to the template model. In particular, the character creation system can transfer the skinning weights leveraging the correspondence and the reference skinning weights on a template or on a series of template characters.

Along somewhat related lines, the character creation system can perform blendshape rigging. In particular, the character creation system can leverage the correspondence and the reference blendshapes on a template or on a series of template characters to allow a blendshapes based rig to be inherited by the imported 3D model. More particularly, the character creation system can apply machine learning techniques. In one or more embodiments, the character creation system can uses machine learning techniques to custom respectively, skin weights and blend shapes to the morphology of the created 3D character. The character creation system can define skin weights and blend shapes on a set of reference template characters—called training set—having different morphologies. The mapping between character morphology and skin weights or blend shapes is learned using machine learning techniques. In one embodiment, the character creation system can uses Principal Component Regression. In other embodiments, any of a variety of machine learning processes appropriate to the requirements of a specific application can be utilized.

The character creation system can further apply 3D model customization. In particular, the correspondence allows the imported 3D model to inherit a series of pre-existing customizations that were built on top of the template character. In one embodiment, the customization is blendshape based. In another embodiment, the customization is bone skinning based. Customizing the character can include applying customization blendshapes, which are designed for the character e.g., nose shape, forehead slope, arm length. The character creation system can transfer the customization blendshapes to the template and corresponding blendshapes may be driven in unison to control the customization of the character, while maintaining proper clothing fitting.

Figure 7A:
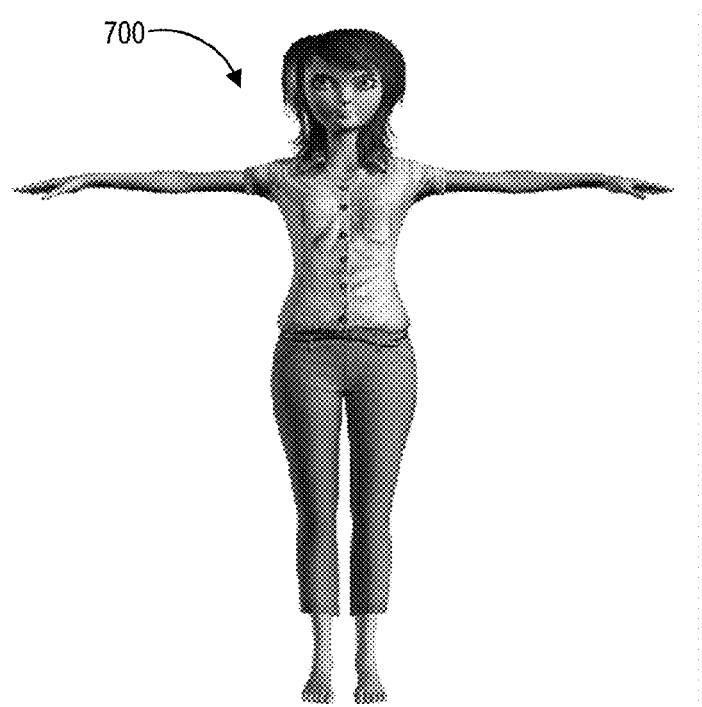
FIGS. 7A-7E illustrate an example process of importing a character scan into the character creation system in accordance with one or more embodiments described herein.

As described above, the character creation system can import a 3D model that was created outside of the character creation system. In addition, in some embodiments, the character creation system can also integrate a character based on a scan of a character. To illustrate, FIGS. 7A-7E illustrate an example process of importing a character into the character creation system using scans. For example, FIG. 7A illustrates a 2D image of a female character 700. As shown, the female character 700 is a biped cartoon captured in a "T" pose. A user may provide one or more images of the female character 700 to the character creation system and request that the character creation system import and integrate into the character creation system.

The character creation system may scan the image (or stereo images) of the female character 700 into the character creation system. Using the scan, the character creation system can identify basic characteristics about the female character 700. For example, the character creation system may identify the height and width of the female character 700. As another example, the character creation system can identify the gender of the female character 700, and whether the character is wearing clothes. As an additional example the identify depth information about the character, such as by identifying RGB or RGB+D information. Further, the character creation system can identify specific features, such as eyes shape, skin tone, mouth lips thickness, etc., and use the specific features to appropriately generate a template that fits the input scans, as described below.

Figure 7B:
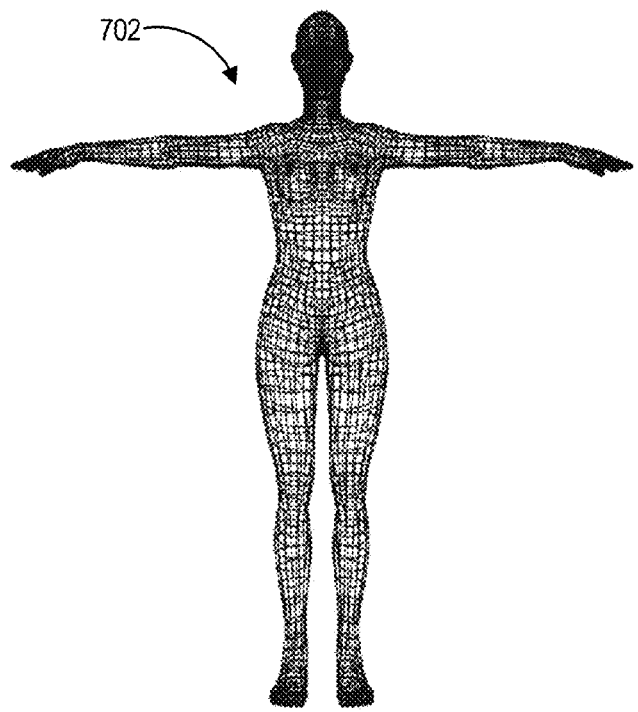

Using the identified characteristics, the character creation system can select a 3D template mesh to apply to the female character 700. For example, as shown in FIG. 7B, the character creation system selects the female 3D template mesh 702. In some embodiments, a user or the character creation system selects a 3D template mesh from a catalog of meshes, which allows the character creation system to better fit the template mesh to an external 3D model or character.

Figure 7C:
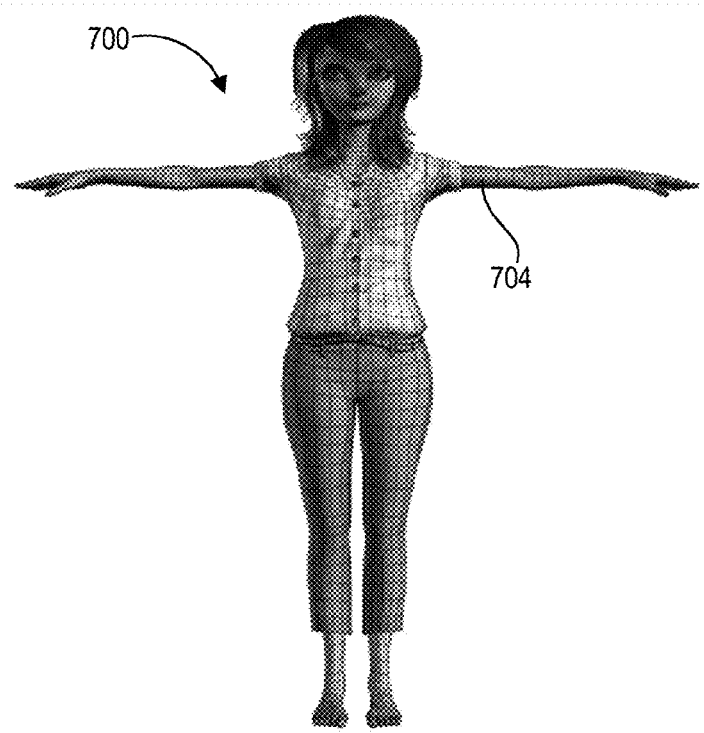
Figure 7D:
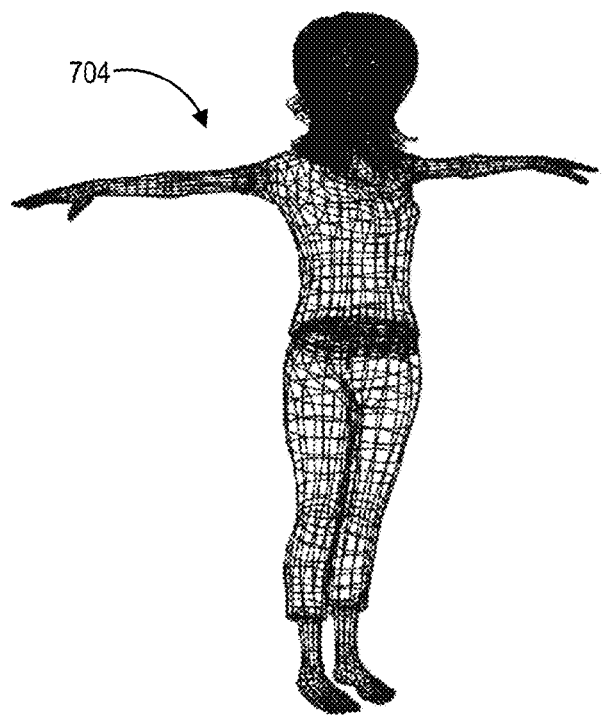

Once the character creation system or a user selects a 3D template mesh 702, the character creation system can apply the female 3D template mesh 702 to the female character 700. In particular, as FIG. 7C illustrates, the character creation system can generate a 3D object or female 3D character mesh 704 based on the female character 700. As part of generating the female 3D character mesh 704, a user can manually manipulate the female 3D template mesh 702 to fit the female character 700. Alternatively, the character creation system can semi-automatically or automatically generate the female 3D character mesh 704 to fit the female character 700. For example, the character creation system can have a user identify key points on the female character 700 and fit the female 3D character mesh 704 to the female character 700 based on the key points. In another example, the character creation system can use machine learning to automatically fit the female 3D character mesh 704 to the female character 700.

In one or more alternative embodiments, rather than projecting the 2D image of the character onto a 3D template mesh, the character creation system employs a third-party system to create a 3D model of the character based on the one or more scans of the character. In these embodiments, the character creation system imports the 3D model as described above. For example, the character creation system may identify a 3D character mesh associated with the model and match vertices of the 3D character mesh to a 3D template mesh.

Once the character creation system generates the female 3D character mesh 704, the character creation system can import the female 3D character mesh 704 into the character creation system as described above. In particular, the character creation system can calculate correspondence values for each vertex in the female 3D character mesh 704. As shown in FIG. 7C, the character creation system can create a fully integrated female 3D character mesh 704 of the female character 700. Then, once imported, the character creation system can use the correspondence values of the female 3D character mesh 704 to customize, rig, and animate the female character. For example, the character creation system can allow the user to change the hair style and/or add different clothes or accessories.

Figure 7E:
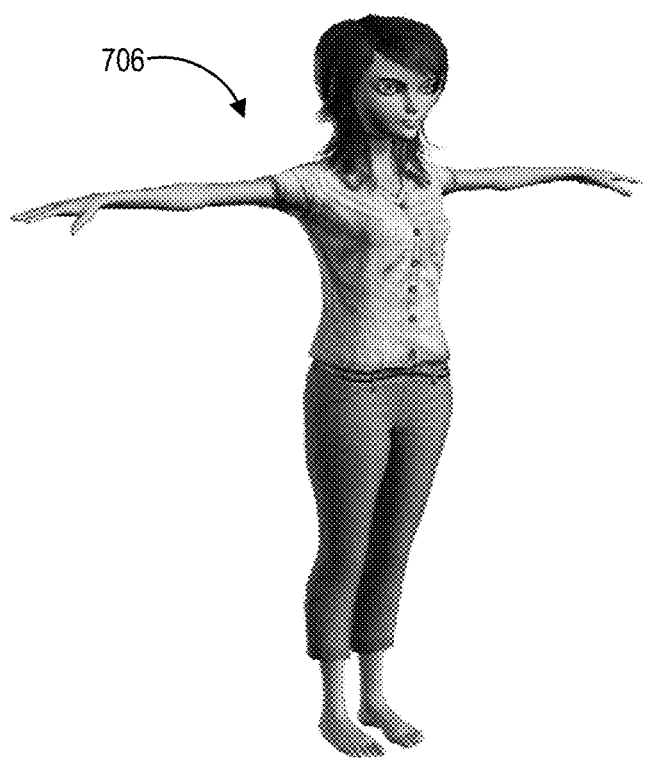

To illustrate, FIG. 7E illustrates a 3D model of the female character 706. The clothes on the 3D female character 706 may be clothes selected by a user within the character creation system, or clothes imported by the user. For instance, just as the character creation system can import characteristics, the character creation system can also import objects (e.g., clothes and accessories) using template meshes and/or UV maps that correspond to the objects being imported and using the import process described above.

Generating a fully functional character from image scans can provide a number of benefits. For example, a user can provide one or more head shot images or full-body images of herself to the character creation system. The character creation system may then automatically, or with limited input for the user, create a 3D model of the user. In the case of having just a head shot, the character creation system may import the head and add the head to a pre-existing model body model. Once imported, the user can customize the imported 3D model, change out body parts, manipulate various body parts, add clothing and accessoriness, etc. Further, the user can rig and animate the imported 3D model, as described above.

Figure 8:
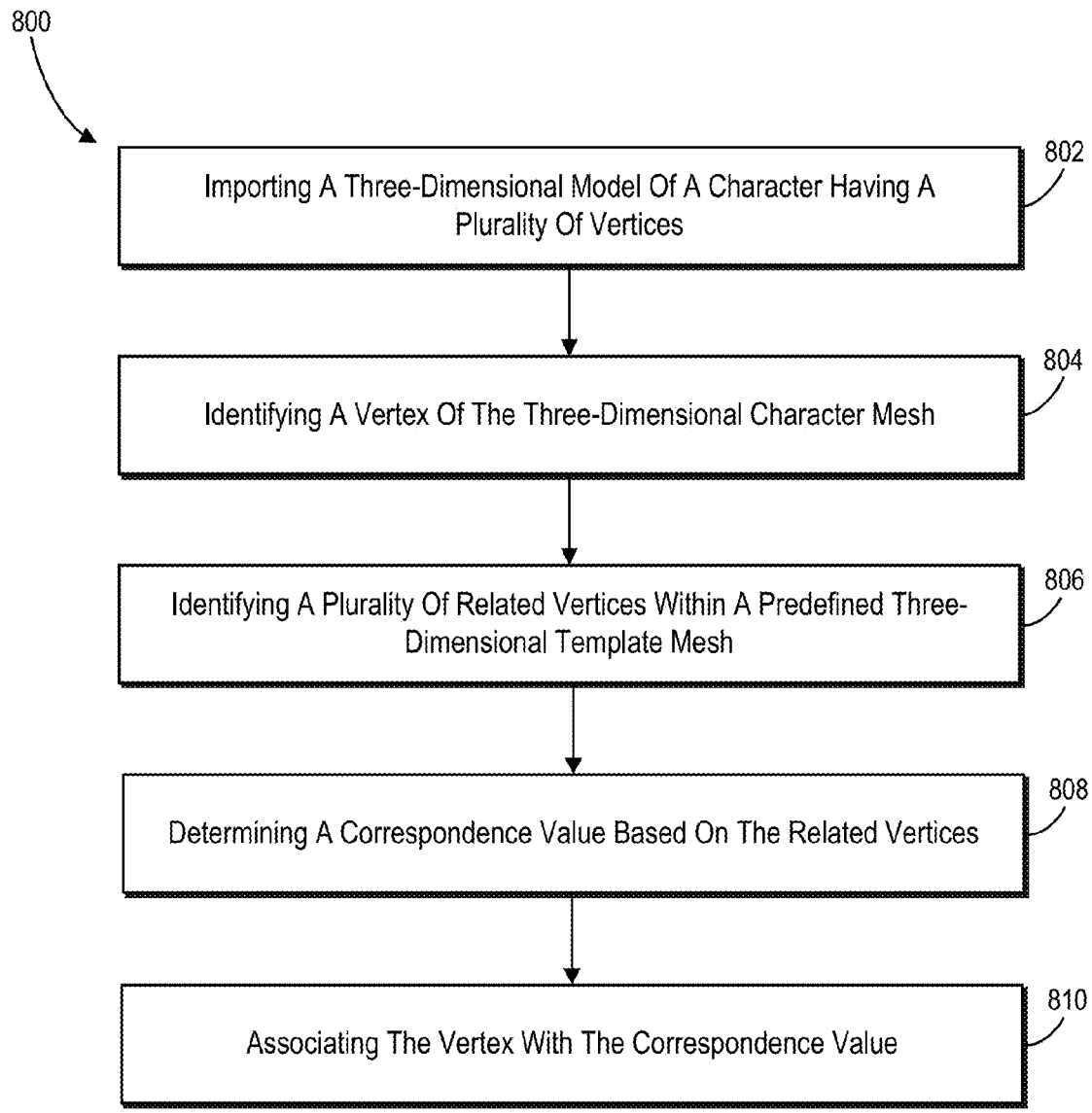
FIG. 8 illustrates a flowchart of a series of acts in a method for integrating an external three-dimensional character into the character creation system in accordance with one or more embodiments described herein.
Figure 9:
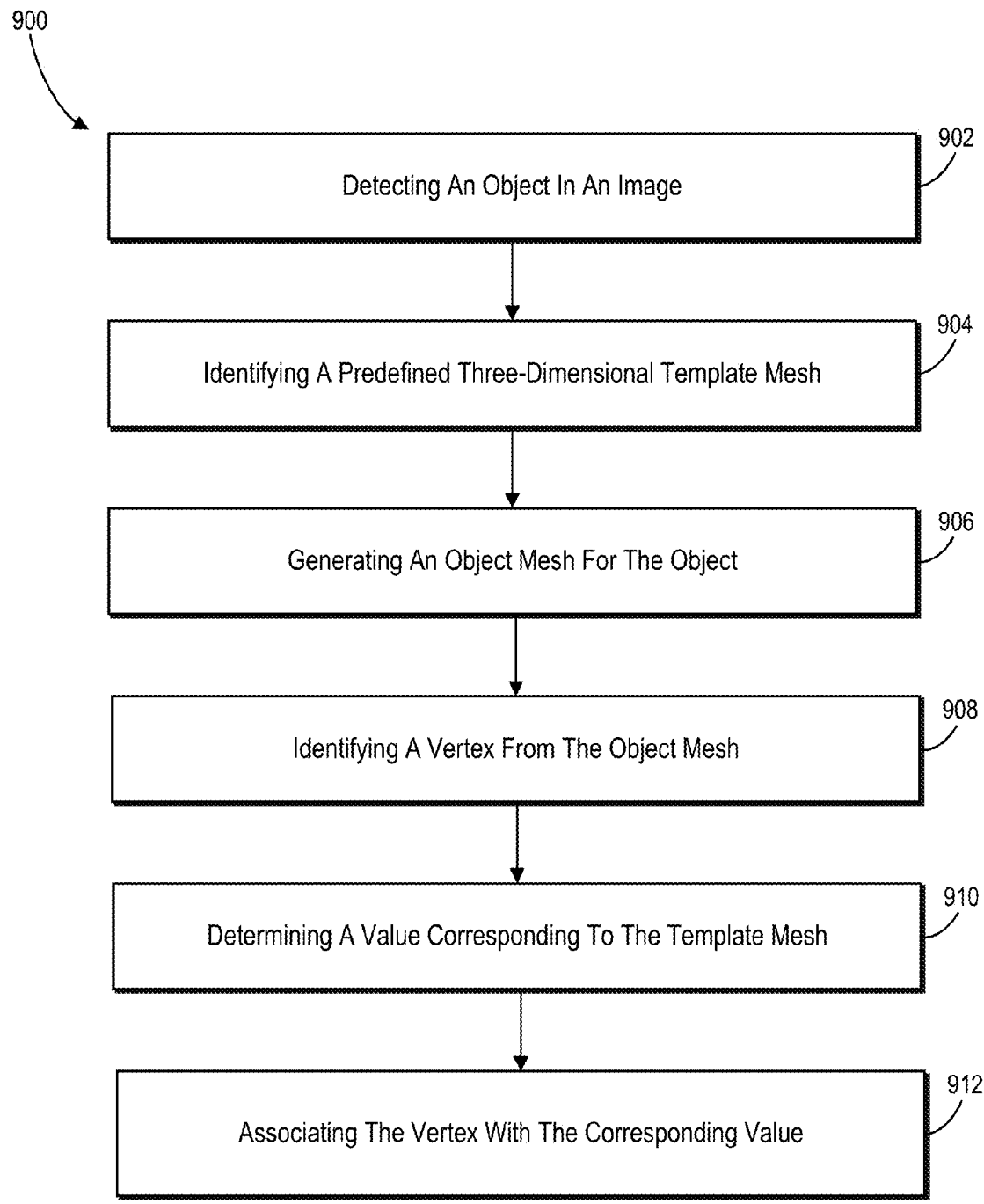
FIG. 9 illustrates a flowchart of a series of acts in a method for importing an external object into the character creation system in accordance with one or more embodiments described herein.

FIGS. 1-7E, the corresponding text, and the examples, provide a number of different systems and devices for integrating an external 3D model into a character creation system. In addition to the foregoing, one or more embodiments can also be described in terms of flowcharts comprising acts and steps in a method for accomplishing a particular result. For example, FIGS. 8 and 9 illustrate flowcharts of exemplary methods in accordance with one or more embodiments. The methods described in relation to FIGS. 8 and 9 may be performed with less or more steps/acts or the steps/acts may be performed in differing orders. Additionally, the steps/acts described herein may be repeated or performed in parallel with one another or in parallel with different instances of the same or similar steps/acts. Furthermore, the character creation system can perform each of the acts described in relation to FIGS. 8 and 9 automatically without user input.

FIG. 8 illustrates a flowchart of a series of acts in a method 800 for integrating an external three-dimensional character into a character creation system in accordance with one or more embodiments described herein. In some example embodiments, the method 800 may be performed by a character creation system. For example, the character creation system described above may perform the series of acts in the method 800.

The method 800 includes an act 802 of importing a three-dimensional model 100 of a character having a plurality of vertices. In particular, the act 802 may involve importing a three-dimensional model of a character 100, the three-dimensional model comprising a three-dimensional character mesh 102 having a plurality of vertices. For example, the act 802 may involve, receiving a three-dimensional model 100 of a character for a user, where the three-dimensional model was created outside of the character creation system.

In addition, the method 800 includes an act 804 of identifying a vertex of the three-dimensional character mesh 102. In particular, the act 804 may involve identifying a vertex of the three-dimensional character mesh 102 that does not have a one-to-one match with a vertex of a predefined three-dimensional template mesh 200. For example, the act 804 may involve detecting if one or more vertices of the three-dimensional character mesh 102 do not directly map to one or more corresponding vertices in the three-dimensional template mesh 200. Further, in some example embodiments, the three-dimensional template mesh is a UV mesh and, in some cases, may be part of a UV map.

The method 800 also includes an act 806 of identifying a plurality of related vertices within a predefined three-dimensional template mesh. In particular, the act 806 involves identifying, based on the vertex of the character mesh, a plurality of related vertices within the predefined three-dimensional template mesh 200. In one or more embodiments, the act 806 may involve determining that the vertex of the character mesh 102 is related to the plurality of vertices of the template mesh 200 when the vertex of the character mesh 102 lands next to the plurality of vertices on the template mesh 200.

The method 800 further includes an act 808 of determining a correspondence value based on the related vertices. In particular, the act 808 may involve determining, for the vertex of the character mesh 102, a correspondence value based on the plurality of identified related vertices from the template mesh 200. For example, the act 808 may involve determining the correspondence value for the vertex by identifying a value of a nearest neighbor from among the plurality of related vertices of the template mesh 200. In another example, the act 808 may involve determining the correspondence value for the vertex by averaging values of the plurality of vertices from the template mesh 200. In a further example, the act 808 may involve determining the correspondence value for the vertex by determining a barycenter value using the plurality of vertices from the template mesh 200.

Further, the method 800 includes an act 810 of associating the vertex with the correspondence value. In particular, the act 810 involves associating the vertex of the character mesh 102 with the correspondence value. In one or more embodiments, the method 800 may involve an act of identifying one or more mapped values for the vertex of the character mesh from a lookup table using the correspondence value, where the lookup table includes mapped values of a texture map, a color map, or a detail overlay map.

In some example embodiments, the method 800 includes the act of leveraging the correspondence value to apply texture, clothing, or accessories to the three-dimensional model. Further, the method 800 may include the act of fitting the applied texture, clothing, or accessory to the three-dimensional model based on the correspondence value. In addition, the method 800 may include the act of rigging the three-dimensional model with a bone structure based on the correspondence value.

FIG. 9 illustrates a flowchart of a series of acts in a method 900 for importing an external object into a character creation system in accordance with one or more embodiments described herein. In some example embodiments, the method 900 may be performed by a character creation system. For example, the character creation system described above may perform the series of acts in the method 900.

The method 900 includes an act 902 of detecting an object in an image. In particular, the act 802 involves detecting an object in one or more images. In some example embodiments, the object is a three-dimensional person or biped character. In alternative embodiments, the object is a non-humanoid object. Further, in some embodiments, the image is a standard RGB picture. In other embodiments, the image includes RGB+D information.

The method 900 also includes an act 904 of identifying a predefined three-dimensional template mesh. In particular, the act 804 involves identifying a predefined three-dimensional template mesh 702 that corresponds to the object. In one or more embodiments, the act 904 may involve selecting three-dimensional template mesh 702 from a catalog of three-dimensional template meshes.

The method 900 further includes an act 906 of generating an object mesh 704 for the object. In particular, the act 806 involves generating an object mesh 704 for the object by transforming the template mesh 702 to match the object. In some example embodiments, the act 906 may involve receiving user input that fits the template mesh 702 to the object. In another embodiment, the act 906 may involve semi-automatically transforming the template mesh 702 to match the object based on a user identifying key points on the object. In yet another embodiment, the act 906 may involve using machine learning to automatically fit the template mesh 702 to the object in any suitable manner as described herein.

In addition, the method 900 includes an act 908 of identifying a vertex from the object mesh 704. In some example embodiments, the act 908 includes identifying a vertex of the object mesh 704 that does not have a one-to-one match with a vertex of the template mesh 702. Further, in one or more embodiments, the act 908 includes selecting, individually, each vertex in the object mesh 704.

The method 900 also includes an act 910 of determining a value corresponding to the template mesh. In particular, the act 910 involves determining, for the vertex from the object mesh, a value corresponding to the template mesh. For example, the act 910 may involve determining the correspondence value for the vertex by identifying a value of a nearest neighbor from among the plurality of related vertices of the template mesh 702. In another example, the act 910 may involve determining the correspondence value for the vertex by averaging values of the plurality of vertices from the template mesh 702. In a further example, the act 910 may involve determining the correspondence value for the vertex by determining a barycenter value using the plurality of vertices from the template mesh 702.

Further, the method 900 includes an act 912 of associating the vertex with the corresponding value. In particular, the act 912 involves associating the vertex of the object mesh with the corresponding value. The method 900 may further include an act of texturing the object mesh with texture from a texture map based on the correspondence value. In some cases, texturing the object mesh includes using the correspondence value to look up a texture value in a texture map lookup table and applying the texture value to the vertex in the object mesh.

Figure 10:
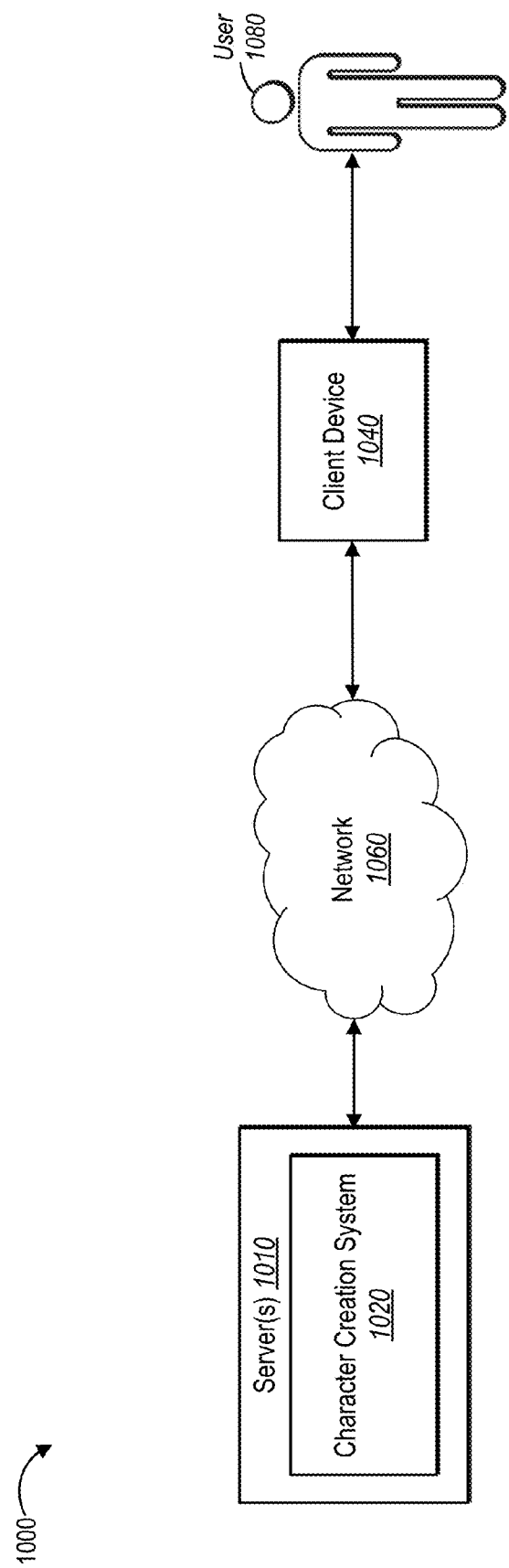
FIG. 10 illustrates an example environment in which a character creation system may operate in accordance with one or more embodiments described herein.

FIG. 10 illustrates a schematic diagram illustrating an example, embodiment of a communication system 1000 (or simply "system 1000"). As shown, the system 1000 includes a character creation system 1020 hosted by one or more server(s) 1010, which is connected to a client device 1040 via a network 1060. The system 1000 also illustrates a user 1080 that interacts with the client device 1040 to communicate with the character creation system 1020. In some cases, the one or more server(s) 1010 may be hosted online. Alternatively, in some embodiments, the character creation system 1020 is not located on the one or more server(s) 1010 but is located locally. For example, in some embodiments, the character creation system 1020 is located within the client device 1040. Further, in one or more embodiments, the character creation system 1020 is separated between the one or more server(s) 1010 and the client device 1040.

In general, the user 1080 can provide an external 3D model of a character to the character creation system 1020. Upon receiving the external 3D model, the character creation system 1020 imports the 3D model by determining correspondence values for each vertex of the 3D model. Once each vertex of the 3D model is associated with a correspondence value, the character creation system 1020 enables the user 1080 to customize the 3D model. Further, the character creation system 1020 can automatically rig and animate the 3D model. Additional detail regarding importing an external 3D model and calculating correspondence values for the 3D model is provided below.

In one or more embodiments, the user 1080 provides one or more images of a character to the character creation system 1020 and the character creation system 1020 can build a 3D model based on the one or more images. Alternatively, the character creation system 1020 may employ a third-party, such as 3D rendering software to create a 3D model from the one or more images of the character. Once the character creation system 1020 obtains the 3D model, the character creation system 1020 can integrate the 3D model as mentioned above.

In some embodiments, the character creation system 1020 imports external objects, such as clothing and/or accessories, provided by the user 1080. For example, the character creation system 1020 may determine correspondence values for each vertex of the external object. Using the correspondence values, the character creation system 1020 allows the user to apply the external object to a 3D model and/or further customize the external object within the character creation system 1020.

Figure 11:
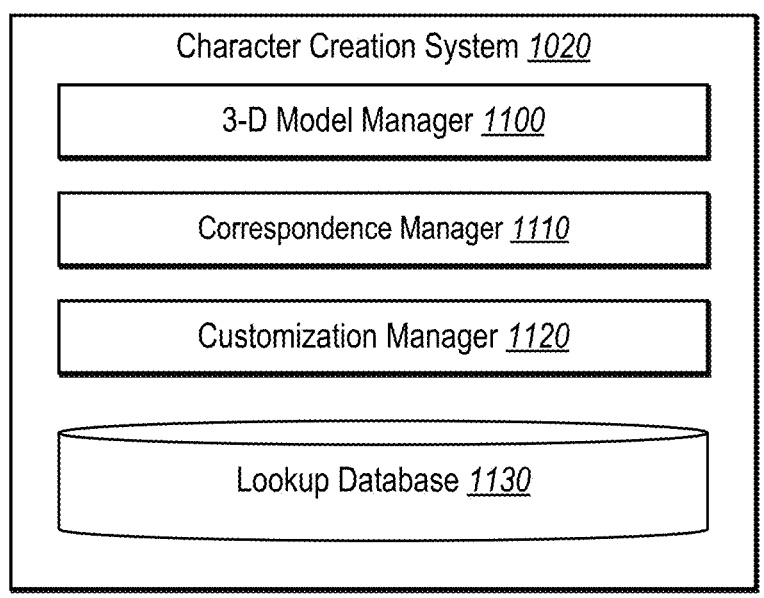
FIG. 11 illustrates an example embodiment of the character creation system of FIG. 10 in accordance with one or more embodiments described herein.

FIG. 11 illustrates a schematic diagram of an example architecture of the character creation system 1020 described above. As shown, the character creation system 1020 can include a 3D model manager 1100, a correspondence manager 1110, a customization manager 1120, and a lookup database 1130.

A general overview with respect of the components of the character creation system 1020 is given below with respect to FIG. 11. Although the disclosure herein describes components of the character creation system 1020 as separate components, as illustrated in FIG. 11, any of the components of the character creation system 1020 may be combined into fewer components, such as into a single facility or module, or, alternatively, divided into more components as may serve one or more embodiments. The components of the character creation system 1020 can comprise software, hardware (e.g., a special purpose processing device to perform a certain function or group of functions), or both (e.g., a combination of computer-executable instructions and hardware). For example, the components of the character creation system 1020 can comprise one or more instructions stored on a computer-readable storage medium and can be executable by processors of one or more computing devices, such as a client device or server device.

As shown, the character creation system 1020 includes a 3D model manager 1100. The 3D model manager 1100 can import external 3D model of a character into the character creation system 1020. As part of importing the external 3D model, the 3D model manager 1100 can identify 3D character mesh of the character. Examples of an external 3D model of a character and a character mesh and shown and described with respect to FIGS. 1A and 1B, respectively.

In some example embodiments, the 3D model manager 1100 can identify a character map associated with the external 3D model. For example, the 3D model manager 1100 may identify a UV character mesh map that provides a 2D representation of the 3D character mesh. Alternatively, in some example embodiments, the 3D model manager 1100 can create a UV character mesh map by mapping the 3D character mesh, as described above.

In addition, the 3D model manager 1100 can identify a predefined three-dimensional UV template mesh (or template mesh) that corresponds to a 3D model created by the character creation system 1020. As mentioned above, because the template mesh is created by the character creation system 1020, each vertex of the template mesh is associated with index values that the character creation system 1020 recognizes and uses to customize, rig, and animate characters built from the template mesh.

Further, the 3D model manager 1100 can also identify a template map (e.g., a UV template map of the template mesh) created from the template mesh. An example of a template map is shown and described with respect to FIG. 3. Further, in some instances, the 3D model manager 1100 can create a template map from the template mesh by mapping the template mesh, as described above.

In some example embodiments, the 3D model manager 1100 receives one or more images from a user of a 3D character, but the images do not have any corresponding 3D structure associated with them. In these embodiments, the 3D model manager 1100 scans the one or more images and creates a 3D model using the image scans. Once the 3D model manager 1100 creates a 3D model, the 3D model manager 1100 can begin importing the 3D character using the 3D model of the character, as mentioned above. In some alternative embodiments the images received by the 3D model manager 1100 have partial 3D structure associated with them, such as RGB+D images.

As shown in FIG. 11, the character creation system 1020 includes a correspondence manager 1110. The correspondence manager 1110 determines a correspondence value for each vertex of the character mesh. In general, when a user creates a unique 3D character outside of the character creation system 1020, vertices and polygons of the character mesh do not directly correlate to vertices and polygons of the template mesh created by the character creation system 1020. As such, the character creation system 1020 cannot perform a direct 1-to-1 vertex mapping. Rather, the correspondence manager 1110 must determine how each vertex of the character mesh corresponds to related vertices of the template mesh before an external 3D model can be fully imported and integrated into the character creation system 1020.

The correspondence manager 1110 can determine if a direct mapping exists between a vertex in the character mesh (or map of the character mesh) and the template mesh (or map of the template map). In the case that a direct mapping exists, the correspondence manager 1110 can cause the vertex or polygon of the character mesh to inherit the index values of the vertex or polygon on the template mesh. For example, upon identifying a direct mapping, the correspondence manager 1110 imports the texture value, shell value, topology value, external mesh value, blendshape value, and color value of the vertex from the template mesh to the corresponding vertex on the character mesh.

If the correspondence manager 1110 does not identify a direct mapping for a vertex of the character mesh, the correspondence manager 1110 can determine a correspondence value for the vertex based on multiple related vertices from the template mesh. For example, the correspondence manager 1110 can calculate a correspondence value from the related vertices using one or more calculations, such as a nearest neighbor interpolation, barycenter calculation, averaging the values of the related vertices, or applying weights to each vertex of the related vertices based on distance and/or relevance.

As shown, and as mentioned above, the character creation system 1020 includes a customization manager 1120. The customization manager 1120 uses the correspondence values to apply customizations (e.g., modifying features, switching out features, and adding textures), rigging, and animations to the character mesh and/or imported 3D model. Specifically, the customization manager 1120 can modify the correspondence value based on user input. For example, if a user adds muscle to the arm of a character, the customization manager 1120 modifies the values of the affected vertices within the imported 3D model to reflect the change.

Further, using the correspondence values, the customization manager 1120 looks up, in the lookup database 1130, attributes to apply to the vertex for each vertex in the imported 3D model. For example, the customization manager 1120 uses the correspondence value for a vertex to identify the texture, color, morph target, blendshapes, and detail overlay to assign to the vertex, or how rigging and animation affect the particular vertex.

As mentioned above, the lookup database 1130 can include information corresponding to various character attributes. In general, the lookup database 1130 provides components of the character creation system 1020 with attribute properties given an attribute and an index value. For example, given an index value, such as a correspondence value, the lookup database 1130 uses the index value to identify properties of one or more character attributes associated with the vertex. If the correspondence value for a vertex subsequently changes (e.g., the user modifies the vertex), the lookup database 1130 can provide updated properties for the one or more character attributes associated with the vertex. Further, because the lookup database 1130 includes index values for vertices rather than every pixel of an imported 3D character, the lookup database 1130 itself is very sparse and can quickly lookup and return values.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
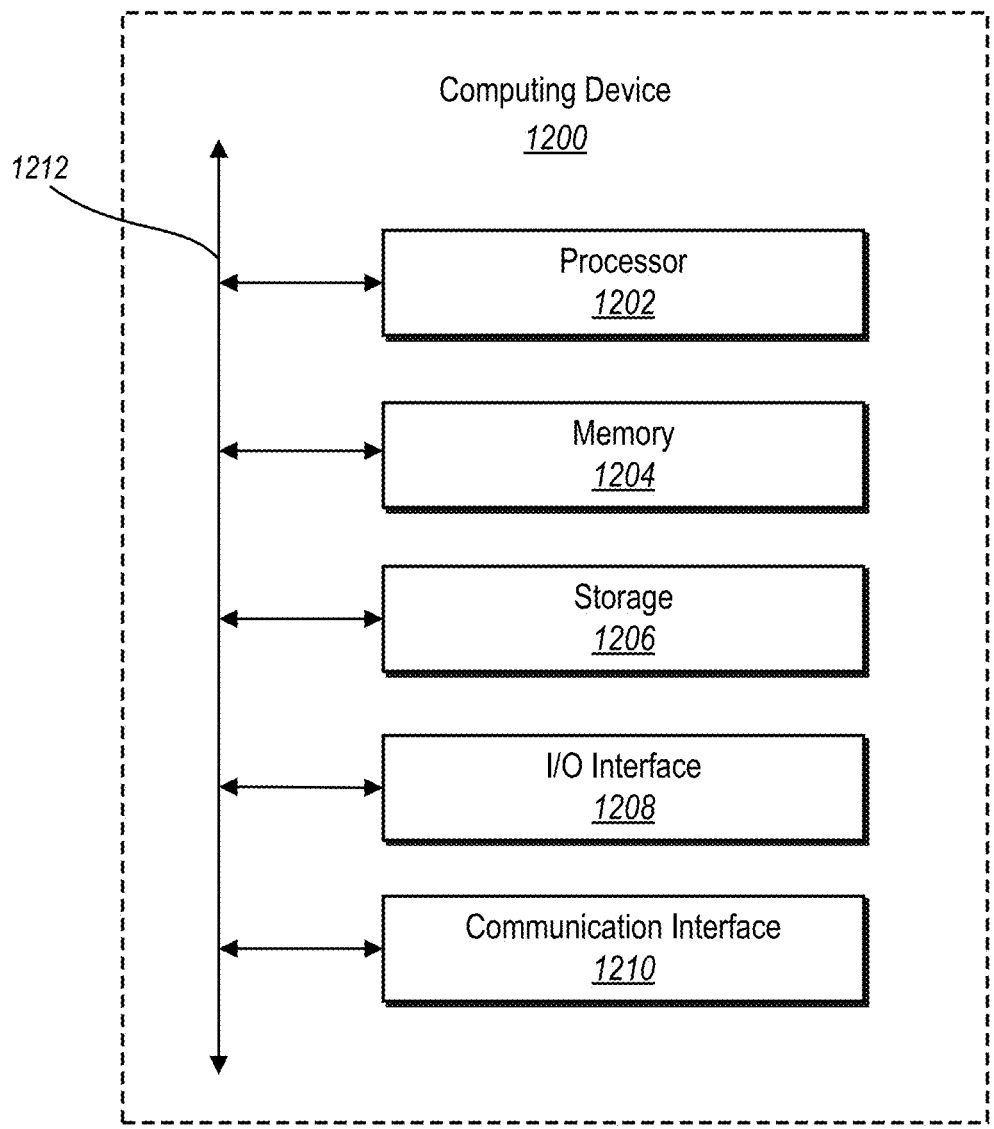
FIG. 12 illustrates a block diagram of an exemplary computing device in accordance with one or more embodiments described herein.

FIG. 12 illustrates a block diagram of an exemplary computing device 1200 that may be configured to perform one or more of the processes described above. One will appreciate that the one or more server(s) 1010 hosting the character creation system 1020 or the computing device 1040 described with respect to FIG. 1 may be example implementation of the client device 1200. As shown by FIG. 12, the computing device 1200 can comprise a processor 1202, memory 1204, a storage device 1206, an I/O interface 1208, and a communication interface 1210, which may be communicatively coupled by way of a communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In particular embodiments, the processor 1202 includes hardware for executing instructions, such as those making up a computer program. As an example and not by way of limitation, to execute instructions, the processor 1202 may retrieve (or fetch) the instructions from an internal register, an internal cache, the memory 1204, or the storage device 1206 and decode and execute them. In particular embodiments, the processor 1202 may include one or more internal caches for data, instructions, or addresses. As an example and not by way of limitation, the processor 1202 may include one or more instruction caches, one or more data caches, and one or more translation lookaside buffers (TLBs). Instructions in the instruction caches may be copies of instructions in the memory 1204 or the storage 1206.

The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The storage device 1206 includes storage for storing data or instructions. As an example and not by way of limitation, the storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. The storage device 1206 may include removable or non-removable (or fixed) media, where appropriate. The storage device 1206 may be internal or external to the computing device 1200. In particular embodiments, the storage device 1206 is non-volatile, solid-state memory. In other embodiments, the storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1208 allows a user to provide input to, receive output from, and otherwise transfer data to and receive data from the computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1210 may facilitate communications via various communication protocols. Examples of communication protocols that may be used include, but are not limited to, data transmission media, communication devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communication networks and technologies.

The communication infrastructure 1212 may include hardware, software, or both that couples components of the computing device 1200 to each other. As an example and not by way of limitation, the communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A method for integrating an external three-dimensional character into a character creation system, comprising:
    importing a three-dimensional model of a character, the three-dimensional model comprising a three-dimensional character mesh having a plurality of vertices, wherein the three-dimensional character mesh is created by a system that is external to the character creation system;
    identifying, by at least one processor, a vertex of the three-dimensional character mesh that does not have a one-to-one match with a vertex of a predefined three-dimensional template mesh based on the three-dimensional character mesh being created by the system that is external to the character creation system;
    identifying, based on the vertex of the three-dimensional character mesh not having the one-to-one match with a vertex of a predefined three-dimensional template mesh, a plurality of related vertices within the predefined three-dimensional template mesh;
    determining, for the vertex of the three-dimensional character mesh not having the one-to-one match with a vertex of the predefined three-dimensional template mesh, a correspondence value based on the plurality of related vertices from the predefined three-dimensional template mesh;
    associating the correspondence value with the vertex of the three-dimensional character mesh not having the one-to-one match with a vertex of the predefined three-dimensional template mesh; and
    rigging the three-dimensional model of the character based on leveraging the correspondence value associated with the vertex of the predefined three-dimensional template mesh.

2. The method of claim 1, further comprising:
    identifying a polygon or edge of the three-dimensional character mesh that corresponds to the vertex;
    identifying a related polygon or edge within the predefined three-dimensional template mesh that corresponds to the plurality of related vertices within the predefined three-dimensional template mesh;
    and wherein determining the correspondence value based on the plurality of related vertices from the predefined three-dimensional template mesh comprises deriving the correspondence value for the polygon or edge of the three-dimensional character mesh based on the related polygon or edge within the predefined three-dimensional template mesh.

3. The method of claim 1, wherein determining the correspondence value for the vertex comprises identifying a value of one or more nearest neighbors from among the plurality of related vertices of the predefined three-dimensional template mesh.

4. The method of claim 1, wherein determining the correspondence value for the vertex comprises averaging values of the plurality of related vertices from the predefined three-dimensional template mesh.

5. The method of claim 1, wherein determining the correspondence value for the vertex comprises determining a barycenter value using the plurality of related vertices from the predefined three-dimensional template mesh.

6. The method of claim 1, further comprising projecting vertices of the three-dimensional character mesh onto a UV map of the predefined three-dimensional template mesh.

7. The method of claim 6, wherein the predefined three-dimensional template mesh and the three-dimensional character mesh use similar UV mappings.

8. The method of claim 7, wherein determining, for the vertex of the three-dimensional character mesh, the correspondence value based on the plurality of related vertices from the predefined three-dimensional template mesh comprises determining the correspondence value in UV map space.

9. The method of claim 6, wherein the vertex of the three-dimensional character mesh is related to the plurality of related vertices of the predefined three-dimensional template mesh when the vertex of the three-dimensional character mesh projects next to the plurality of related vertices on the UV map of the predefined three-dimensional template mesh in UV map space.

10. The method of claim 1, further comprising:
    detecting an edge vertex within the plurality of related vertices from the predefined three-dimensional template mesh;
    identifying, based on detecting the edge vertex, a mesh portion in the predefined three-dimensional template mesh that corresponds to the vertex of the three-dimensional character mesh; and
    wherein determining the correspondence value for the vertex comprises determining, within the identified mesh portion, the correspondence value based on the edge vertex.

11. The method of claim 1, further comprising identifying one or more mapped values for the vertex of the three-dimensional character mesh from a lookup table using the correspondence value.

12. The method of claim 11, wherein the lookup table comprises mapped values of a texture map, a color map, or a detail overlay map.

13. The method of claim 1, further comprising leveraging the correspondence value to apply texture, clothing, or an accessory to the three-dimensional model.

14. The method of claim 1, further comprising rigging the three-dimensional model with a bone structure based on the correspondence value.

15. The method of claim 1, further comprising:
identifying a feature within the predefined three-dimensional template mesh that corresponds to the correspondence value;
associating the feature with the vertex of the three-dimensional character mesh;
identifying additional vertices from the three-dimensional character mesh that share the identified feature; and
replacing the vertex and the additional vertices on the three-dimensional character mesh with a set of replacement vertices that provides an alternative structure of the feature.

16. A method for importing an external object into a 3D character creation system, comprising:
detecting an object from one or more images;
identifying, by at least one processor, a predefined three-dimensional template mesh that corresponds to the object;
generating an object mesh for the object by transforming the predefined three-dimensional template mesh to match the object;
identifying a vertex from the object mesh that does not have a one-to-one match with a vertex of the predefined three-dimensional template mesh;
identifying, based on the vertex from the object mesh not having the one-to-one match with the vertex of the predefined three-dimensional template mesh, a plurality of related vertices within the predefined three-dimensional template mesh;
determining, for the vertex from the object mesh not having the one-to-one match with the vertex of the predefined three-dimensional template mesh, a value corresponding to predefined three-dimensional the template mesh based on the plurality of related vertices from the predefined three-dimensional template mesh;
associating the corresponding value with the vertex of the object mesh not having the one-to-one match with the vertex of the predefined three-dimensional template mesh; and
leveraging the correspondence value associated with the vertex of the predefined three-dimensional template mesh to rig the object.

17. The method of claim 16, wherein identifying the predefined three-dimensional template mesh that corresponds to the object comprises identifying a portion of the predefined three-dimensional template mesh that corresponds to the object; and
the method further comprising supplementing the object mesh with an addition portion of the predefined three-dimensional template mesh.

18. The method of claim 16, wherein texturing the object mesh comprises:
using the correspondence value to look up a texture value in a texture map lookup table; and
applying the texture value to the vertex in the object mesh.

19. The method of claim 18, wherein the object is a non-human object.

20. A system for integrating an external three-dimensional character into a character creation system, comprising:
at least one processor; and
at least one non-transitory computer readable storage medium storing instructions that, when executed by the at least one processor, cause the system to:
import a three-dimensional model of a character, the three-dimensional model comprising a three-dimensional character mesh having a plurality of vertices, wherein the three-dimensional character mesh is created by a system that is external to the character creation system;
identify a vertex of the three-dimensional character mesh that does not have a one-to-one match with a vertex of a predefined three-dimensional template mesh based on the three-dimensional character mesh being created by a system that is external to the character creation system;
identify, based on the vertex of the three-dimensional character mesh not having the one-to-one match with a vertex of a predefined three-dimensional template mesh, a plurality of related vertices within the predefined three-dimensional template mesh;
determine, for the vertex of the three-dimensional character mesh not having the one-to-one match with a vertex of the predefined three-dimensional template mesh, a correspondence value based on the plurality of related vertices from the predefined three-dimensional template mesh;
associate the correspondence value with the vertex of the three-dimensional character mesh not having the one-to-one match with the vertex of a predefined three-dimensional template mesh; and
rig the three-dimensional model of the character based on leveraging the correspondence value associated with the vertex of the predefined three-dimensional template mesh.

* * * * *